US 9,747,252 B2

(12) United States Patent
Tianxiang

(10) Patent No.: US 9,747,252 B2
(45) Date of Patent: *Aug. 29, 2017

(54) SYSTEMATIC METHOD OF CODING WAVE-PIPELINED CIRCUITS IN HDL

(71) Applicant: Weng Tianxiang, Diamond Bar, CA (US)

(72) Inventor: Weng Tianxiang, Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,539

(22) Filed: Feb. 5, 2016

(65) Prior Publication Data

US 2016/0231991 A1    Aug. 11, 2016

Related U.S. Application Data

(60) Provisional application No. 62/112,611, filed on Feb. 5, 2015.

(51) Int. Cl.
*G06F 9/44* (2006.01)
*G06F 15/82* (2006.01)
*G06F 17/50* (2006.01)

(52) U.S. Cl.
CPC ............... *G06F 15/82* (2013.01); *G06F 8/31* (2013.01); *G06F 8/71* (2013.01); *G06F 17/5054* (2013.01); *G06F 17/505* (2013.01); *G06F 2217/84* (2013.01)

(58) Field of Classification Search
USPC ....................................................... 717/107
See application file for complete search history.

(56) References Cited

U.S. PATENT DOCUMENTS

| | | | | | |
|---|---|---|---|---|---|
| 5,825,658 | A | * | 10/1998 | Ginetti ................ | G06F 17/5031 716/108 |
| 5,953,519 | A | * | 9/1999 | Fura .................... | G06F 17/5022 716/103 |
| 6,026,219 | A | * | 2/2000 | Miller ................. | G06F 17/5045 703/23 |

(Continued)

OTHER PUBLICATIONS

Burleson et al. "Wave-Pipelining: A Tutorial and Research Survey", IEEE Transactions on Very Large Scale Integration (VLSI) Systems, vol. 6, No. 3, Sep. 1998, pp. 464-474.*

*Primary Examiner* — Marina Lee

(57) ABSTRACT

The present invention classifies all critical paths into two basic types: a series critical path and a feedback critical path, and divides each of wave-pipelined circuits into two components: a static logic part, called critical path component (CPC), and a dynamic logic part, formalized into four wave-pipelining components (WPC) shared by all wave-pipelined circuits. Each wave-pipelining ready code in HDL comprises two components: a WPC instantiation and a CPC instantiation wire-connected and linked by a new link statement. Each WPC has new wave constants which play the same role as generic constants do, but whose initial values are determined and assigned by a synthesizer after code analysis, so designers can use after-synthesization information in their code before synthesization for wave-pipelining technology. The responsibility of analyzing and manipulating wave-pipelining ready code, generating and implementing wave-pipelined circuits on a design-wide or chip-wide scale in HDL is shifted from designers to synthesizers.

24 Claims, 9 Drawing Sheets

(56) References Cited

U.S. PATENT DOCUMENTS

| | | | |
|---|---|---|---|
| 6,212,666 B1* | 4/2001 | Gohl | G06F 17/5031 |
| | | | 716/108 |
| 6,289,498 B1* | 9/2001 | Dupenloup | G06F 17/5045 |
| | | | 716/103 |
| 6,996,799 B1* | 2/2006 | Cismas | G06F 17/5045 |
| | | | 703/14 |
| 7,640,526 B1* | 12/2009 | Blodget | G06F 17/5054 |
| | | | 703/22 |
| 8,296,711 B2* | 10/2012 | Ispir | G06F 17/5045 |
| | | | 716/132 |
| 8,893,071 B1* | 11/2014 | Gaide | G06F 17/5054 |
| | | | 716/113 |
| 9,046,572 B2* | 6/2015 | Wang | G06F 17/5045 |
| 9,575,929 B2* | 2/2017 | Tianxiang | G06F 8/31 |
| 2002/0186246 A1* | 12/2002 | Burnette | G06F 17/5045 |
| | | | 715/771 |
| 2003/0149954 A1* | 8/2003 | McElvain | G06F 17/505 |
| | | | 716/103 |
| 2005/0114110 A1* | 5/2005 | Rammel | G06F 17/5036 |
| | | | 703/14 |
| 2005/0273752 A1* | 12/2005 | Gutberlet | G06F 8/443 |
| | | | 716/104 |
| 2010/0218146 A1* | 8/2010 | Platzker | G06F 17/505 |
| | | | 716/103 |
| 2014/0075257 A1* | 3/2014 | Wang | G06F 17/5045 |
| | | | 714/731 |
| 2016/0131707 A1* | 5/2016 | Wang | G06F 17/5045 |
| | | | 714/731 |
| 2016/0231991 A1* | 8/2016 | Tianxiang | G06F 8/31 |
| 2016/0231992 A1* | 8/2016 | Tianxiang | G06F 8/31 |
| 2016/0232129 A1* | 8/2016 | Tianxiang | G06F 8/31 |

* cited by examiner

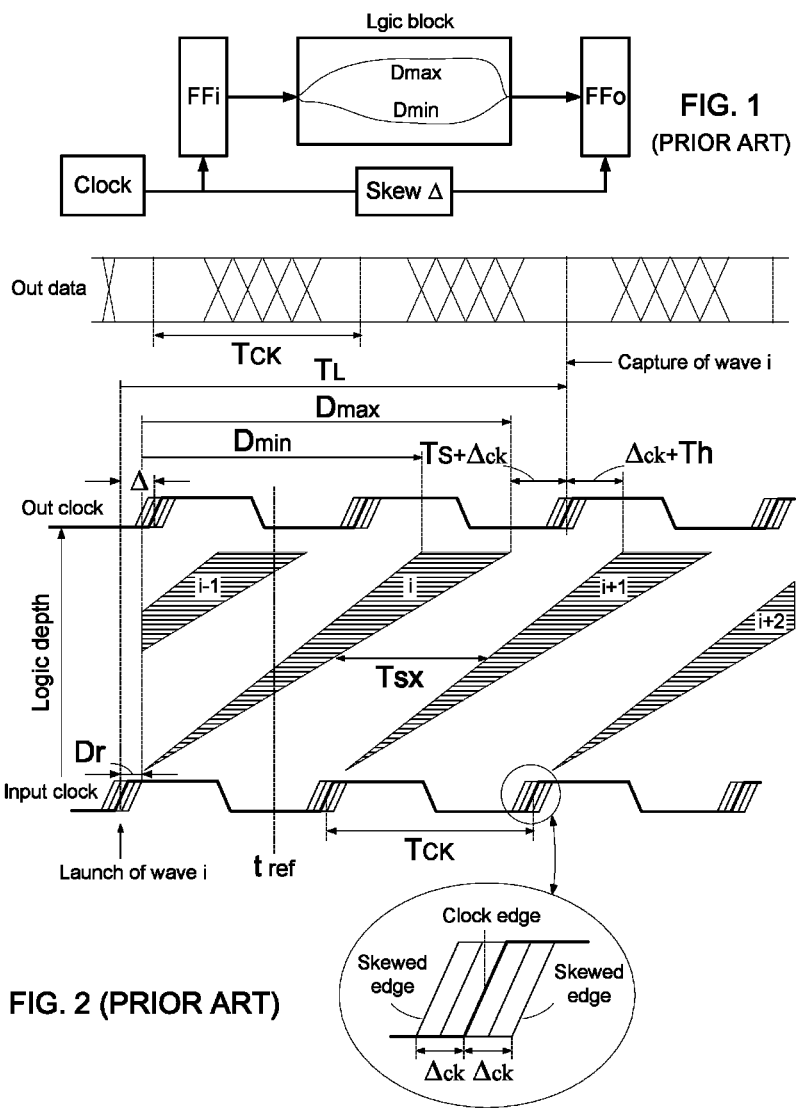

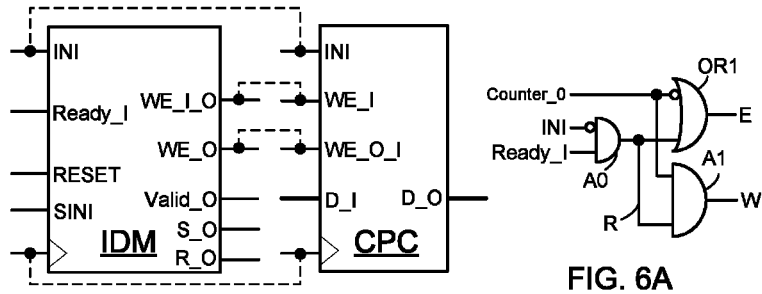
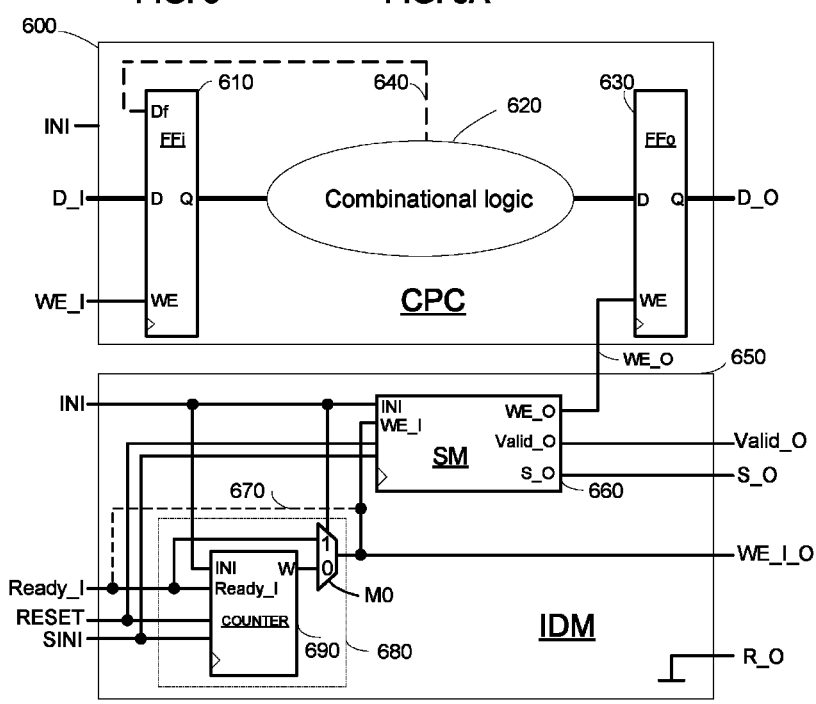
FIG. 5  FIG. 5A  FIG. 6A
FIG. 6

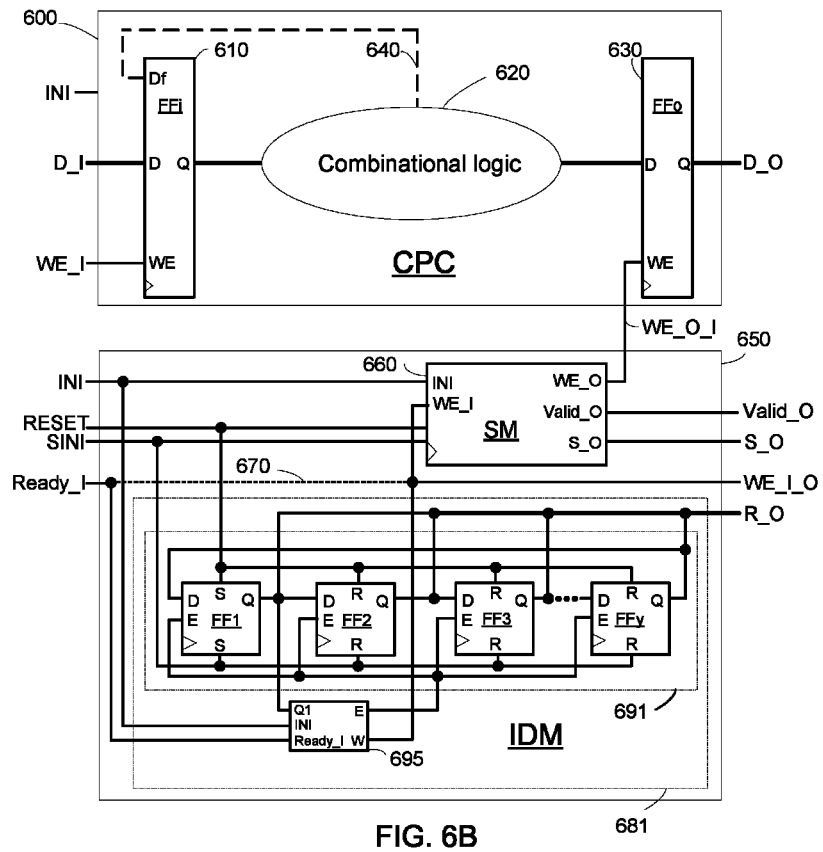
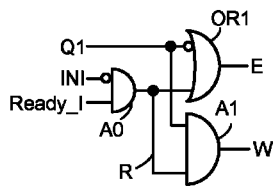
FIG. 6C

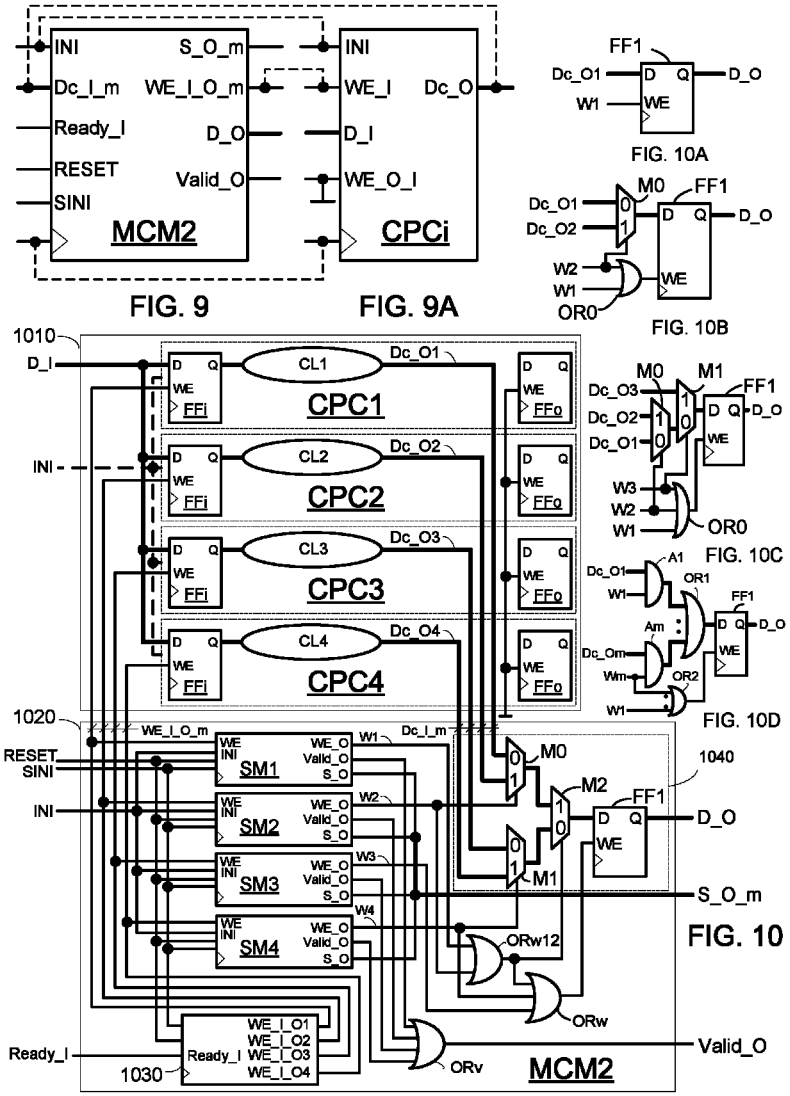

Ready_I ———————————— WE_I_O1
FIG. 11
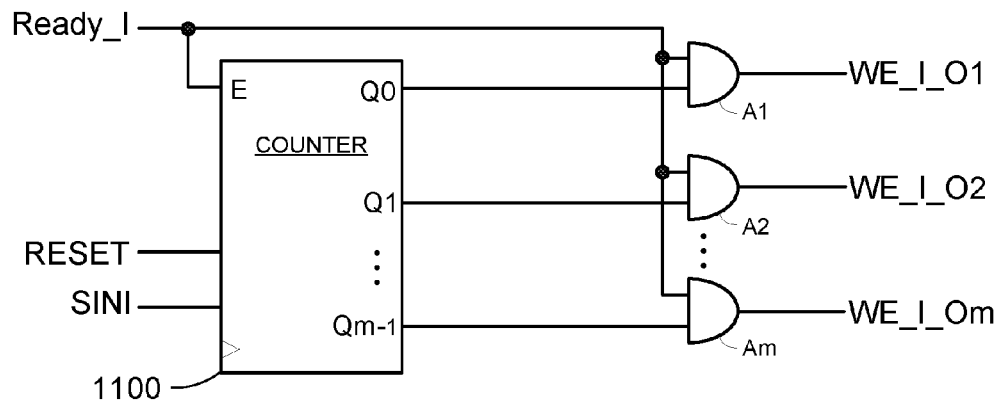
FIG. 11A
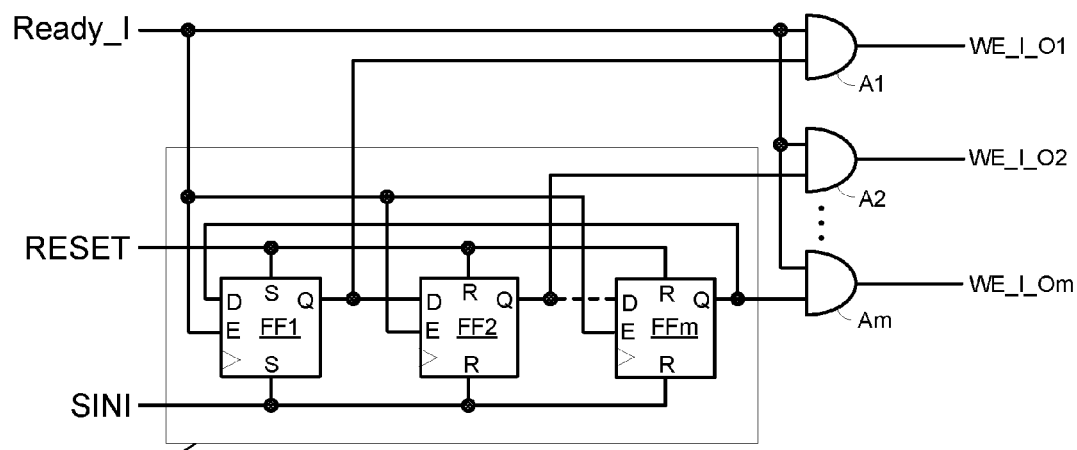
FIG. 11B

SYSTEMATIC METHOD OF CODING WAVE-PIPELINED CIRCUITS IN HDL

CROSS-REFERENCE TO RELATED APPLICATIONS

This application claims priority of provisional patent application No. 62/112,611 filed to USPTO on Feb. 5, 2015 by the same author.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

WPC-CPC.txt file is a source code list in VHDL and submitted to USPTO via the office electronic filing system (EFS-WEB) and incorporated by reference here. Weng-WPC-CPC.txt is 52,089 bytes long and was created on Jan. 29, 2015 by the application applicant.

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to Hardware Description Language (HDL), especially to its addition of the capability of making digital designers able to code wave-pipelined circuits on a design-wide or chip wide scale in HDL.

2. Description of the Related Art

HDL refers to all current hardware description languages VHDL, Verilog, SystemVerilog and so on.

A synchronous digital system contains a lot of registers. Valid data flow through successive registers from system input registers to system output registers. All data flows are synchronous with triggering edges of a chip clock. For example, data flow from registers A to registers B, from registers B to registers C and so on in a successive order on the same clock cycle.

A path in a synchronous digital system is a route between any neighboring registers connected by combinational logic. If the target running frequency for a digital design is predetermined, the upper limit of propagating time for any paths is determined and has the inverse value of the target running frequency. A path is called a critical path if the time signals take to propagate through it is beyond the predetermined propagating time, and the time is called the path's critical time. If there are any critical paths, digital designers must spend time reducing all critical times by all means and eliminating all critical paths to meet the target running frequency.

Wave-pipelining is a technology which completes an operation that needs several clock cycles to propagate without intermediate registers and with input data acceptable on every clock cycle. For example, in a conventional pipelining operation, data flow from registers A to registers D through registers B and C to divide the critical path time into multiple smaller intervals to meet the critical time: A→B→C→D; with wave-pipelining, data flow through registers A and D without intermediate registers B and C. Absolutely, wave-pipelining will reduce logic resource usage and is superior to the conventional pipelining technology if it can be used.

FIG. 1 shows a prior art full picture of how wave-pipelining technology applies. There are input registers FFi and output registers FFo; data flow from the input registers FFi through combinational logic paths to the output registers FFo and signals take more than one clock cycles to propagate through it without any intermediate registers and with input data acceptable on every clock cycle. In the combinational logic block there are two special paths marked by Dmax and Dmin. Dmax is the longest path for signals to propagate from the input registers FFi to the output registers FFo while Dmin is the shortest path to do that.

FIG. 2 shows a prior art timing graph any wave-pipelined circuit must comply with if input data is acceptable on every clock cycle and earlier sent data will not be contaminated by later sent data.

Here are the most important inequalities involving wave-pipelining from paper "Wave-Pipelining: A Tutorial and Research Survey" by Wayne P. Burleson et al in IEEE Trans. Very Large Scale Integra. (VLSI) Syst., vol. 6, no. 3, pp. 464-474, September 1998.

Dmin and Dmax: The minimum and maximum propagation delays in the combinational logic block.
Tck: Clock-period.
Ts, Th: Register setup and hold times.
Dr: Propagation delay of a register.
$\Delta$: Constructive known clock skew between the output and input registers.
$\Delta ck$: Worst case uncontrolled clock skew at a register.
N: The number of clock cycles needed for a signal to propagate through the logic block before being latched by the output register.
Tl: The time at which the data should be clocked by the triggering edge of the output register N clock cycles after it has been clocked by the input register.
Tsx: The minimum time that node x must be stable to correctly propagate a signal through the gate.
dmin(x), dmax(x): the shortest and longest propagation delays from primary inputs to node x in the combinational logic block.

Due to possible constructive skew $\Delta$ (of arbitrary value) between the output and the input registers:

$$Tl = NTck + \Delta. \tag{1}$$

The lower bound on Tl is given by $$Tl > Dr + Dmax + Ts + \Delta ck. \tag{2}$$

The upper bound on Tl is given by $$Tl < Tck + Dr + Dmin - (\Delta ck + Th). \tag{3}$$

Combining constraints (2) and (3) gives the well-known maximum rate pipelining condition of Cotton $$Tck > (Dmax - Dmin) + Ts + Th + 2\Delta ck. \tag{4}$$

Combining inequalities (1), (2) and (3) gives the following inequality $$Dr+D\max+Ts+\Delta ck<NTck+\Delta<Tck+Dr+D\min-(\Delta ck+Th). \quad (5)$$

To simplify the interpretation of the above relations two parameters Tmax and Tmin are introduced:

$$T\max=Dr+D\max+Ts+\Delta ck-\Delta \quad (6)$$

which represents the maximum delay through the logic, including clocking overhead and clock skews, while $$T\min=Dr+D\min\Delta ck-Th-\Delta \quad (7)$$

represents the minimum delay through the logic. With this, (5) can be expressed as follows:

$$T\max/N<Tck<T\min/(N-1) \quad (8)$$

If, for a temperature above the nominal, Tmax and Tmin are increased by a factor $\beta s>1$ and for a temperature below the nominal, decreased by a factor $\beta f<1$ and the following inequality can be given $$\beta s \cdot T\max/N<Tck<\beta f \cdot T\min/(N-1) \quad (9)$$

Inequality (9) may include other factors with new parameters $\beta s$ and $\beta f$ and still holds.

The following Internal node constraint must also be satisfied at each node x of the circuit:

$$Tck>(d\max-d\min)+Tsx+\Delta ck. \quad (10)$$

Currently many memory chip manufacturers successfully use wave-pipelining in their memory chip products with higher rate outputs, reduced power consumption and logic resources; and a few scientists use FPGA chips as a base to show some circuits can be done with wave-pipelining in isolated environments. Their works prove that the wave-pipelining is a very powerful tool to reduce power consumption and logic resources. Now there are three major existing obstacles preventing any ordinary digital designers from using the wave-pipelining in HDL:

Any workable wave-pipelined circuit must be guaranteed in any situations that earlier sent data will not be contaminated by later sent data. Currently there are no commercial synthesizers that are capable of doing that. Only circuit or synthesizer manufactures have the capability to accurately calculate point-to-point signal travel timings within a circuit to determine the data contamination problem.

The software algorithms making wave-pipelining successful, like Wong and Klass algorithms and others, have already been developed and matured, but ordinary digital designers have no means or resources to access to the technology, because there are no international HDL standards on how synthesizer manufacturers incorporate those capabilities into their products.

HDL needs the capabilities for digital designers to easily write wave-pipelining ready code for any number of critical paths on a design-wide or chip-wide scale instead of in an isolated environment and the written code can be identified, synthesized and used to generate wave-pipelined circuits by any synthesizer in ASIC or FPGA, and they should be part of HDL standards.

What the present invention hopes to do is:

Invent a wave-pipelining coding system as new part of HDL standards for designers to write wave-pipelining ready code that includes:
  a) The code can be easily written in HDL to generate very complex wave-pipelined circuits.
  b) The code can be identified, synthesized and used to generate wave-pipelined circuits by any synthesizer in ASIC or FPGA.

Shift burdens of analyzing and manipulating wave-pipelining ready code, generating and implementing wave-pipelined circuits on a design-wide or chip-wide scale in HDL from individual designers to synthesizer manufacturers.

If the coding system becomes new part of HDL standards all synthesizer manufactures will automatically be forced to implement all well-known wave-pipelining algorithms and techniques within their products, a competition will start for better implementations, making wave-pipelining technique available to every digital designer in HDL.

Here are some prior art definitions.

A path in a synchronous digital system is called a critical path if it meets the following three conditions:
  The path has input registers and output registers.
  The input registers and output registers are connected by combinational logic without intermediate registers.
  Signals take more than one clock cycle to propagate through the path under a designated target running frequency.

A critical path may occur in two situations:
  When the combinational logic between the input and output registers is so complex that signals take more than one clock cycle to propagate through the path under a designated target running frequency.
  When all intermediate registers among a conventional pipeline operation are removed and it is hoped to be implemented using wave-pipelining to save resources and reduce power consumptions.

Traditionally the conventional wave-pipelining are mostly focused on the second situations in an isolated environment, but this invention pays attentions to both situations on a design-wide or chip-wide scale.

A path is called a feedback of a critical path if it meets two conditions:
  Input data to the input registers of the critical path partially comes from the middle of its combinational logic.
  Signals take more than one clock cycle to propagate from a part of the input registers through the path to a part of the input registers under a designated target running frequency.

BRIEF SUMMARY OF THE INVENTION

The present invention classifies all critical paths into two basic types: a series critical path and a feedback critical path, and divides each of wave-pipelined circuits into two components: one is static logic part and called critical path component (CPC); another is dynamic logic part and formalized into four wave-pipelining components (WPC) shared by all wave-pipelined circuits. Under the present invention each of standard wave-pipelining ready code in HDL comprises two components: a WPC instantiation and a CPC instantiation which are wire-connected and linked by a new concurrent link statement. Each of four WPC embodiments has a group of new type wave constant, which plays the same role as a generic constant does, but whose initial value is determined and assigned by a synthesizer after it has analyzed the linked CPC component under slow mode and target mode, respectively, so designers can use after-synthesization information in their code before synthesization in HDL for wave-pipelining technology. Following the instructions of the present invention creates a situation that digital designers can write wave-pipelining ready code in HDL and the responsibility of analyzing and manipulating wave-pipelining ready code, generating and implementing wave-pipelined circuits on a design-wide or chip-wide scale in HDL is shifted from individual designers to synthesizer manufacturers.

BRIEF DESCRIPTION OF THE DRAWINGS

FIG. 1 shows a prior art full picture of how wave-pipelining technology applies.

FIG. 2 shows a prior art timing graph any wave-pipelined circuit must comply with if input data is acceptable on every clock cycle and earlier sent data will not be contaminated by later sent data.

FIG. 5 is the interface of a WPC embodiment input_delay_module (IDM) linked with a series or feedback CPC in FIG. 5A.

FIG. 5A is the interface of a series or feedback CPC linked with a WPC input_delay_module in FIG. 5.

FIG. 6 is the schematics of a WPC embodiment input_delay_module using a counter and linked with a series or feedback CPC and with input data acceptable on every one or more clock cycle.

FIG. 6A is the schematics of the controller of the counter 690 in FIG. 6.

FIG. 6B is the schematics of a WPC embodiment input_delay_module using a right rotator and linked with a series or feedback CPC and with input data acceptable on every one or more clock cycle.

FIG. 6C is the schematics of the controller 695 of right rotator 690 in FIG. 6B under target mode with the number of input data clock cycles being greater than 1.

FIG. 9 is the interface of a WPC embodiment multiple_copy_module2 (MCM2) linked with one of multiple copied series or feedback CPCs in FIG. 9A.

FIG. 9A is the interface of one of multiple copied series or feedback CPCs linked with a WPC multiple_copy_module2 in FIG. 9.

FIG. 10 is the schematics of a WPC embodiment multiple_copy_module2 linked with four copies of a series or feedback CPC under target mode and with input data acceptable on every clock cycle.

FIG. 10A is the schematics of select box 1040 in FIG. 10 for a WPC multiple_copy_module2 linked with one series or feedback CPC under either slow mode or target mode.

FIG. 10B is the schematics of select box 1040 in FIG. 10 for a WPC multiple_copy_module2 linked with two copied series or feedback CPCs under target mode.

FIG. 10C is the schematics of select box 1040 in FIG. 10 for a WPC multiple_copy_module2 linked with three copied series or feedback CPCs under target mode.

FIG. 10D is the schematics of select box 1040 in FIG. 10 for a WPC multiple_copy_module2 linked with any other number of copies of a series or feedback CPC under target mode.

FIG. 11 is the schematics of the controller of a WPC multiple_copy_module linked with one series or feedback CPC under either slow mode or target mode.

FIG. 11A is the schematics of the controller of a WPC multiple_copy_module using a counter under target mode with wave constant multiple_copy_number=m, m>1.

FIG. 11B is the schematics of the controller of a WPC multiple copy module using a right rotator under target mode with wave constant multiple_copy_number=m, m>1.

DETAILED DESCRIPTION OF THE INVENTION

Figures 3, 3A, 4A:
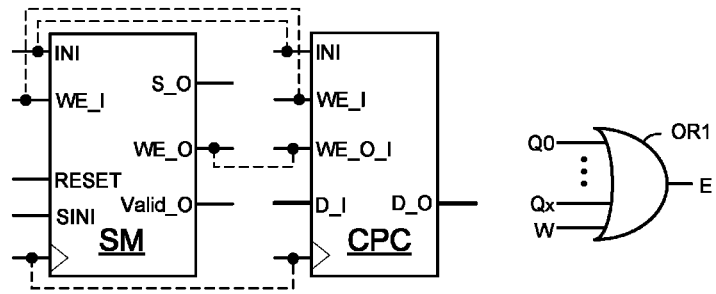
FIG. 3 is the interface of a WPC embodiment series_module (SM) linked with a series CPC in FIG. 3A.
FIG. 3A is the interface of a series CPC linked with a WPC series_module in FIG. 3.
FIG. 4A is the schematics of the right shift register controller 460 of a WPC series_module (SM).

Here are some new definitions.

A critical path is called a series critical path if it has no feedback.

A critical path is called a feedback critical path if it has feedback.

A critical path refers to either of a series critical path and a feedback critical path.

A feedback is called the feedback of a feedback critical path if it is the longest feedback among all feedbacks of the feedback critical path.

A generalized wave-pipelining is a technology which completes an operation for which signals need several clock cycles to propagate from the input registers to the output registers without intermediate registers and with input data acceptable on every one or more clock cycle. A traditional wave-pipelining technology has input data acceptable on every clock cycle.

A circuit is called a wave-pipelined circuit if the circuit has input and output registers without intermediate registers, signals take more than one clock cycle to propagate through it with input data acceptable on every one or more clock cycle. This definition includes the generalized wave-pipelining situation.

A working running frequency for a design is called slow running frequency if signals are assumed to take one clock cycle to propagate through any of critical paths in the full design with input data acceptable on every clock cycle under the running frequency.

A working running frequency for a design is called target running frequency if signals take one or more clock cycle to propagate through any of critical paths coded by designers, and determined and confirmed by a synthesizer in the full design with input data acceptable on every one or more clock cycle under the running frequency.

A segment of source code for a critical path in HDL is called a wave-pipelining ready code if it comprises a pair of a WPC instantiation and a CPC instantiation which are wire-connected and linked by a link statement with the WPC executing the dynamic logic part and the CPC executing the static logic part of a critical path, and has not been confirmed by a synthesizer that it meets all wave-pipelining requirements with input data acceptable on every one or more clock cycle under the designated target running frequency.

A wave-pipelining ready code is called a wave-pipelined circuit if it has been confirmed by a synthesizer that it meets all wave-pipelining requirements with input data acceptable on every one or more clock cycle under the designated target running frequency.

A number of clock cycles is called the number of series clock cycles for a path if it is the number of clock cycles for signals to take to propagate from the input registers to the output registers of the path. The number of series clock cycles for a non-critical path is 1.

A number of clock cycles is called the number of input data clock cycles for a path if input data is acceptable on every the number of clock cycles through the path.

A number of clock cycles is called the number of feedback clock cycles for a path with feedbacks if input data is acceptable on every the number of clock cycles through the feedback of the path.

The present invention can deal with both wave-pipelining and generalized wave-pipelining technology, and later only term wave-pipelining is used.

The reason to generalize normal wave-pipelined circuit with input data acceptable on every more than one clock cycle is that in practice the wave-pipelining requirements (9) and (10) are often too stricter to be met and either of two following methods can relax the requirements and make the successful rate 100%:

Input data is acceptable on every more than one clock cycles.

Signals go through one of multiple copied critical paths alternately with input data acceptable on every clock cycle.

Inequality (9) can be relaxed if input data is acceptable on every X clock cycles by using the following inequality, X>1:

$$\beta s*Tman/N<Tck<\beta f*Tmin/(N-X) \quad (11)$$

Inequality (10) can be relaxed if input data is acceptable on every X clock cycles by using the following inequality, X>1:

$$X*Tck>(dmax-dmin)+Tsx+\Delta ck. \quad (12)$$

It can always accept input data on every clock cycle by multiple coping input registers and combinational logic X times that is permissible and doable in some cases.

There are five methods that may be used individually or together to make a critical path meeting the wave-pipelining requirements.

Adjust clock skew for the output registers to let them meet the range of (9).

Shift range of (9) into new position by increasing Tmax and Tmin simultaneously.

Equalize delays at inputs to all gates.

Relax the right part of inequality (9) and the left part of inequality (10) by limiting input data on every two or more clock cycles.

Multiple copy a critical path and get input data passing through each of multiple copied critical paths alternately.

Main Idea Behind the Present Invention

The most difficult part coding all types of wave-pipelined circuits on a design-wide scale in HDL is that a wave-pipelined circuit code always comprises two logic parts:

A static logic part: it doesn't change if the number of series clock cycles through the circuit changes and is unique for each of wave-pipelined circuits.

A dynamic logic part: it does change if the number of series clock cycles through the circuit changes and is the same for one of groups of wave-pipelined circuits.

Every wave-pipelined circuit has its own change rules and those changes are unknown to designers when they are writing code and will be known to a synthesizer only after it has analyzed the circuit.

The present invention classifies all critical paths into two basic types: a series critical path and a feedback critical path, and divides each of wave-pipelined circuits into two components: one is static logic part and called critical path component (CPC); another is dynamic logic part and formalized into four wave-pipelining components (WPC) shared by all wave-pipelined circuits. Under the present invention each of standard wave-pipelining ready code in HDL comprises two components: a WPC instantiation and a CPC instantiation which are wire-connected and linked by a new concurrent link statement. Each of four WPC embodiments has a group of new type wave constant, which plays the same role as a generic constant does, but whose initial value is determined and assigned by a synthesizer after it has analyzed the linked CPC component under slow mode and target mode, respectively, so designers can use after-synthesization information in their code before synthesization in HDL for wave-pipelining technology. Following the instructions of the present invention creates a situation that digital designers can write wave-pipelining ready code in HDL and the responsibility of analyzing and manipulating wave-pipelining ready code, generating and implementing wave-pipelined circuits on a design-wide or chip-wide scale in HDL is shifted from individual designers to synthesizer manufacturers.

How the Method Works

The systematic method of coding wave-pipelined circuits in HDL comprises following ten parts:

1. Define five signals, one counter, one switch and one table that will be used when generating wave-pipelining circuits on a design-wide or chip-wide scale in HDL.
2. Define the interfaces of a CPC each of which encapsulates a critical path's static logic part.
3. Define and implement four WPC embodiments in HDL each of which is a critical path's dynamic logic part: a series_module, an input_delay module, a multiple_copy_module1 and a multiple_copy_module2.
4. Define one new keyword wave and three new wave constants which provide a means to dynamically transfer after-synthesization information to designers' code before synthesization.
5. Define the methods of determining and searching for wave constant values of a known WPC instantiation under slow mode and target mode, respectively.
6. Define three versions of a concurrent link statement: link1, link2 and link3, and rules on how they are used.
7. Define the pairing rules between a WPC and a CPC.
8. Define how a digital designer prepares wave-pipelining ready code systematically.
9. Shift the responsibility of analyzing and manipulating wave-pipelining ready code, generating and implementing wave-pipelined circuits on a design-wide or chip-wide scale in HDL from individual designers to synthesizer manufacturers.

10. Define how four WPC embodiments are simulated and debugged under any of current versions of a synthesizer in HDL.

It is fair to put the burden of successfully generating wave-pipelined circuits based on wave-pipelining ready code squarely on synthesizer manufacturers' shoulder if all necessary information is passed to a synthesizer. For example, with tens of papers claiming that successful wave-pipelined circuits are implemented in FPGA chips in an isolated environment, it is the responsibility of FPGA synthesizers to be capable of generating those wave-pipelined circuits in a design-wide environment without designers' further involvements, a process similar for them to the task of generating a circuit with the highest running frequency and minimum used resources if possible for any normal digital design code.

Definitions of Wave-Pipelining Component and Critical Path Component

A design component is called a critical path component (CPC) if it is an entity (a term in VHDL-2002) in HDL and encapsulates the static logic part of a critical path which is to be wave-pipelined circuit. There are two types of CPCs:
  A series CPC: it encapsulates a series critical path's static logic part.
  A feedback CPC: it encapsulates a feedback critical path's static logic part.

A CPC also refers to a CPC instantiation when it will not be misunderstood. The required interfaces of both a series CPC and a feedback CPC are always the same. The combinational logic of a CPC may be located within or outside of the component and there is no limit on it.

A design component is called a wave-pipelining component (WPC) if it is an entity in HDL, provided by HDL in a new wave-pipelining system library and used to generate a critical path's dynamic logic part, i.e., to generate output data valid signal and write enable signals to the input and output registers of a critical path.

There are three types of WPC:
  A series_module is used to connect to a series CPC with input data acceptable on every clock cycle.
  An input_delay_module is used to connect to a series or feedback CPC with input data acceptable on every one or more clock cycle.
  A multiple_copy_module1 or a multiple_copy_module2 is used to connect to multiple copied series or feedback CPCs with input data acceptable on every clock cycle.

A WPC also refers to a WPC instantiation when it will not be misunderstood. Later multiple_copy_module refers to either of multiple_copy_module1 and multiple_copy_module2.

A synthesizer's New Signals, Switch and Table

A synthesizer that is able of handling wave-pipelining needs six signals, one switch, one table and the table's row index to help finish its job:
  A floating signal target_running_frequency: it is set up by a designer and the target running frequency under which a design finally runs.
  A bit signal generate_circuit: it is set up by a designer and its initial value is deasserted. A synthesizer will generate related circuit files for a design under slow mode for slow mode hardware testing if generate circuit is asserted and no errors are detected after a synthesization, or will not otherwise. A synthesizer will always generate related circuit files for a design under target mode for target mode hardware testing if no errors are detected after a synthesization.
  A bit signal feedback_bit: it is set up by a synthesizer and its initial value is deasserted. Assert the bit if a CPC is being analyzed and determined to have feedbacks, and deassert it after the analysis is finished.
  A bit signal keep_target_circuit: it is set up by a designer and its initial value is deasserted. Assert the bit if a designer wants to keep all CPC new circuits automatically and successfully modified by a synthesizer under target mode unchanged under slow mode when he is switching to synthesize the same design from under target mode to under slow mode and the related code doesn't change, or deassert it otherwise. The bit provides a method for a designer to check if the new automatically and successfully modified circuits by a synthesizer don't change basic logic.
  An integer signal parent_series_clock_number: it is set up by a synthesizer and Its initial value is zero. When the instantiation of a WPC delay_input_module or multiple_copy module is being analyzed and executed its series_clock_number value is stored in parent_series_clock_number, and it is cleared to zero when the execution is finished.
  An integer signal start_number: it is set up by a synthesizer and used when the synthesizer determines that a CPC cannot meet the wave-pipelining requirements with input data acceptable on every clock cycle and the CPC is linked with a WPC input_delay_module or multiple_copy_module. The start_number is made equal to 2 if a WPC multiple_copy_module is linked or to feedback_clock number if a WPC input_delay_module is linked as the starting value of wave constant input_clock_number or multiple_copy_number.
  A bit switch running_mode: it is set up by a designer and it has two valid values with slow mode being its initial value:
    Slow mode: under slow mode a digital designer designs his code, a design is synthesized, simulated, and hardware tested under the following assumptions:
      Signals take one clock cycle to propagate through any of CPCs under slow running frequency.
      Any of CPCs has input data acceptable on every clock cycle.
      No multiple copied CPCs are generated.
    Target mode: under target mode a design is synthesized, simulated, hardware tested and finally runs under predetermined target running frequency, and its implementation is determined and generated by a synthesizer under the following assumptions:
      Signals take one or more clock cycle to propagate through any of CPCs as designed.
      Each of CPCs has input data acceptable on every one or more clock cycle as wave-pipelining ready code indicates and it is necessary.
      Multiple copied CPCs are generated as wave-pipelining ready code indicates and it is necessary.
  A wave constant signal table: it is generated and manipulated by a synthesizer and stores information about each linked pair of a CPC and a WPC; all wave constant values and alias wave constant values can be accessed from the table.
  An integer row_index to the wave constant signal table: it is set up by a synthesizer and its initial value is 1. It is used as a row index for a new link statement in the wave constant signal table and will be increased by 1 after a synthesizer finishes the filling of the row during the source code scanning.

New Keyword Wave and Wave Constant in HDL

When writing wave-pipelining code, digital designers don't know how many clock cycles signals need to propagate through a critical path, and to finish their jobs, it may take several working cycles for them manually to adjust their code to make a wave-pipelined circuit working. This method is not feasible on a design-wide or chip-wide scale, because a design may have 100 or more critical paths to be wave-pipelined circuits and there is no guarantee for designers to perfectly remember which is finished and which is not, and most importantly, synthesizers are left aside of the business of wave-pipelining, giving no help at all. One of obstacles using wave-pipelining in HDL is how to establish a communication channel between a synthesizer and digital designers to provide the following essential functions:

How a designer can use after-synthesization information to write code for wave-pipelined circuits before they have been synthesized in HDL for wave-pipelining technology. This function is not necessary for successfully generating a wave-pipelined circuit, but beneficial to implement a complex one.

If all pieces of wave-pipelining ready code are written, a design has passed simulations and/or hardware testing under slow mode perfectly, and a synthesizer certifies that all wave-pipelining requirements are met with input data acceptable on every one or more clock cycle and no errors are detected after a synthesization, then correct full design circuits can be generated under target mode and work as designed with no code change during the switching from slow mode to target mode or vice versa on a design-wide or chip-wide scale. This function is critical and essential for successfully generating all wave-pipelined circuits on a design-wide or chip-wide scale in HDL.

New keyword wave and three wave constants are introduced to resolve the problem. In the following listing characters in bold type are new suggested definitions based on VHDL-2002.

```
entity_declaration ::=
  entity identifier is
    entity_header
    entity_declarative_part
  [begin
    entity_statement_part ]
  end[ entity ] [ entity_simple_name ] ;
entity_header ::=
  [formal_generic_clause ]
  [formal_port_clause ]
generic_clause ::= generic ( generic_list ) ;
generic_list ::= generic_interface_list
interface_list ::= interface_element { ; interface_element }
interface_element ::= interface_declaration
interface_declaration ::=
  interface_constant_declaration
  |interface_wave_constant_declaration
  | interface_signal_declaration
  | interface_variable_declaration
  | interface_file_declaration
interface_constant_declaration ::=
  [constant] identifier_list : [ in] subtype_indication [ := static_expression
]
interface_wave_constant_declaration ::=
  wave [constant] wave_constant_list : [ in ] subtype_indication
    [ := static_expression ]
```

```
wave_constant_list ::=
  wave_constant_element { , wave_constant_element }
wave_constant_element ::=
  wave_constant
  |internal_wave_constant
wave_constant ::=
  series_clock_number
  | input_clock_number
  | multiple_copy_number
internal_wave_constant ::= one_hot
entity_declarative_part ::=
  { entity_declarative_item }
entity_declarative_item ::=
  subprogram_declaration
  | subprogram_body
  | type_declaration
  | subtype_declaration
  | constant_declaration
  | alias_wave_constant_declaration
  | signal_declaration
  |shared_variable_declaration
  | file_declaration
  | alias_declaration
  | attribute_declaration
  | attribute_specification
  | disconnection_specification
  | use_clause
  | group_template_declaration
  | group_declaration
architecture_body ::=
  architecture identifier of entity_name is
    architecture_declarative_part
  begin
    architecture_statement_part
  end[ architecture ][ architecture_simple_name ];
architecture_declarative_part ::=
  { block_declarative_item }
block_declarative_item ::=
  subprogram_declaration
  | subprogram_body
  | type_declaration
  | subtype_declaration
  | constant_declaration
  | alias_wave_constant_declaration
  | signal_declaration
  | shared_variable_declaration
  | file_declaration
  | alias_declaration
  | component_declaration
  | attribute_declaration
  | attribute_specification
  | configuration_specification
  | disconnection_specification
  | use_clause
  | group_template_declaration
  | group_declaration
constant_declaration ::=
  constant identifier_list : subtype_indication [ := expression ] ;
alias_wave_constant_declaration ::=
  wave [ constant ] alias_wave_constant_list : subtype_indication :=
    wave_constant ;
alias_wave_constant_list ::=
  alias_wave_constant { , alias_wave_constant }
alias_wave_constant ::= identifier
```

The set of following rules is called wave constant mechanism:

There are three wave constants related to wave-pipelining technique: series_clock_number, input_clock_number and multiple_copy_number.

A wave constant can only be declared in the generic clause of the entity definition of a WPC embodiment, plays the same role as a generic constant declared in the same place does except that it has actual initial value 1 under slow mode, and actual initial value equal to or greater than 1 determined and assigned by a synthesizer under target mode, and the static expression in an interface wave constant declaration is always ignored.

A WPC instantiation must not include corresponding association element with a formal wave constant in the generic map aspect.

Any wave constant declared in a WPC definition is accessible by designers through an alias wave constant declaration.

An alias wave constant declaration identifies a list of alias wave constants which are assigned a wave constant. Each alias wave constant must be linked with a WPC instantiation through a link statement and shares the wave constant value of the linked WPC instantiation for testing, debugging or implementing purpose. An alias wave constant plays the same role as a normal constant declared in the same place does.

A CPC may have any of its linked WPC's wave constants and output signals as its own input signal, but must have no input signals which are related to any unrelated WPC instantiation's wave constants.

The internal wave constant one_hot is used internally by a synthesizer to optimize the implementation of a WPC and not accessible by designers.

A synthesizer has its discretion to determine internal wave constant one_hot value based on the environment and the consideration of its production technique used unless a WPC input_delay_module has its R_O output connected in which case one_hot will be '1' in order to generate valid R_O output signal.

Wave-Pipelining Component Series Module (SM) in HDL

FIG. 3 is the interface of a WPC embodiment series module (SM) linked with a series CPC in FIG. 3A. CLK, RESET and SINI are three standard input signals for a synchronous component and the same for each of four WPCs, and play the same roles. CLK is clock source of the CPC. RESET is a global asynchronous initialization input signal. SINI is a global synchronous initialization input signal. Either of RESET/SINI is used to initialize a SM and one of them must be asserted once to keep SM in initial working status before it is used. One of RESET/SINI is necessary and another is optional, and if one of RESET/SINI is not used, it must be connected to '0' to make it optimized out.

FIG. 3 has two additional input signals and three output signals:

Input signal INI is designed to load initialization data into the linked series CPC. Input data at D_I for the linked CPC is initialization data if INI is asserted, or working input data otherwise. The assertion of input signal INI may last as long as needed. Input INI must be connected to '0' or left opened with default value being '0' if the linked CPC doesn't need initialization data. Input signal INI must be asserted after one of RESET/SINI is asserted to make sure that SM is at the initial state, or wait for the series_clock_number of clock cycles to let the CPC go empty.

Input signal WE_I drives write enable signal to the input registers of the linked CPC; input data at D_I of the linked CPC will be latched into the input registers of the CPC on the next clock cycle if WE_I is asserted on the current clock cycle, or will not otherwise.

Output signal WE_O drives write enable signal to the output registers of the linked CPC; current arriving wave of combinational logic data will be latched into the output registers on the next clock cycle if WE_O is asserted on the current clock cycle, or will not otherwise.

Output signal Valid_O is a data valid output signal; data at D_O of the linked CPC is valid if Valid_O is asserted or invalid otherwise.

Output signal S_O is the Q outputs of each of internal right shift registers and may be useful when debugging or implementing a wave-pipelining ready code and optional. No extra logic will be generated if it is left opened without connection.

The assertion of each of WE_I, WE_O and Valid_O lasts one clock cycle for each valid input or output data, respectively.

FIG. 3A is the interface of a series CPC linked with a WPC series_module in FIG. 3. In addition to the global input signal CLK, the interface has four input signals and one output signal that are essential to wave-pipelining:

Input signal INI is optional. If it exists, input data at D_I for the CPC is initialization data when INI is asserted, or working input data otherwise. The INI assertion may last as long as needed.

Input signal WE_I is shared with the linked SM as write enable signal to the input registers.

Input signal D_I is data input bus to the CPC.

Input signal WE_O_I is write enable signal to the output registers of the CPC. It comes from the linked SM output signal WE_O and is used to latch current arriving wave of combinational logic data into output registers.

Output signal D_O is output data bus. Output data at D_O is valid if output signal Valid_O of the linked SM is asserted, or invalid otherwise.

A CPC in FIG. 3A may have any number of additional input and output signals to assist the component and those signals are not drawn here. The dashed lines between FIG. 3 and FIG. 3A show how input and output signals of two components, a WPC SM and a series CPC, are connected. In addition to the connection of global clock signal CLK there are three connections between the two connected components:

Input signals INI of both WPC and CPC are connected together if the CPC needs to load initialization data into it before working normally.

Input signals WE_I of both components are connected.

Output signal WE_O of SM in FIG. 3 drives write enable signal WE_O_I of its linked series CPC in FIG. 3A.

Figure 4:
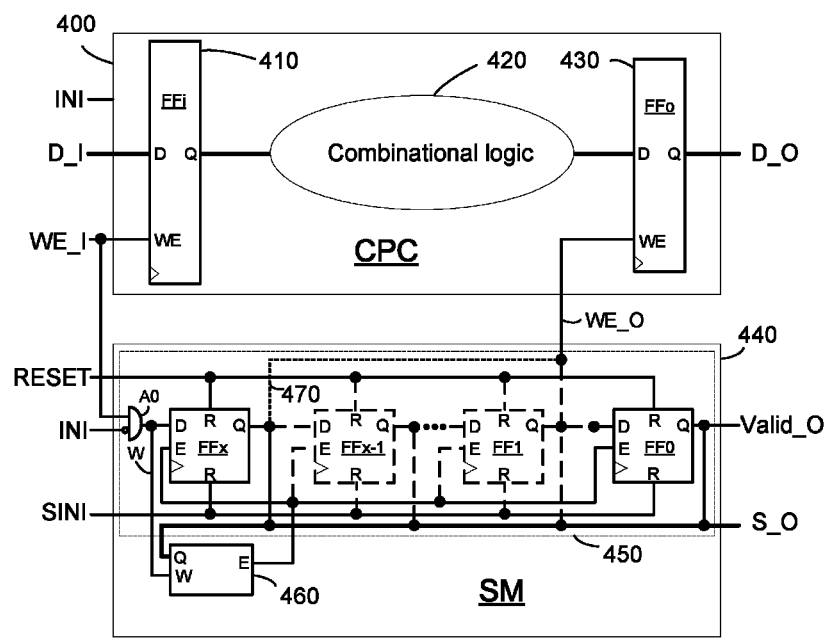
FIG. 4 is the schematics of a WPC embodiment series_module linked with a series CPC and with input data acceptable on every clock cycle.

FIG. 4 is the schematics of a WPC embodiment series_module (SM) linked with a series CPC and with input data acceptable on every clock cycle. 400 is a series CPC; 410 is the input registers of input data bus width; 420 is its combinational logic circuit; 430 is the output registers of output data width and input data bus width may be different from output data width. 440 is a SM linked with a series CPC 400 and comprises two sub-components: 450 is right shift registers with two or more bits; 460 is the right shift register controller and its schematics are shown in FIG. 4A. In FIG. 4 dotted line 470 represents the situations when signals take one clock cycle to propagate through the series CPC 400 under either slow mode or target mode; dashed lines represent the situations where the design runs under target mode and signals take X clock cycles to propagate through the series CPC 400 with X>1. The dotted line 470 and dashed lines are mutually exclusive.

A SM is essentially right shift registers 450 with a variable length and its controller 460. The right shift registers have X+1 bits, where X is the number of series clock cycles for CPC 400. When a designer designs a series CPC or it runs under slow mode, signals are assumed to take one clock cycle to propagate through the component, X=1 and the right shift registers have 2 bits; when the CPC runs under target mode, its number of series clock cycles is X, determined by a synthesizer, and the right shift registers have X+1 bits. S_O output signal is Q outputs of each bit register of the right shift registers 450 for possible debugging or implementing use and optional.

After either RESET or SINI input signal is asserted, the right shift registers are cleared immediately for RESET or on the next clock cycle for SINI. Each bit register of the right shift registers is connected together one after another with its Q output driving D input of next bit register with following exceptions:

A 2-input and-gate A0 has one input coupled to input signal WE_I, another inversely coupled to input signal INI, and its output driving node W, D input of the most left bit register FFx and input W of controller 460.

The Q output of second most right bit register drives output signal WE_O.

The Q output of the most right bit register FF0 drives output signal Valid_O.

A linked pair of a SM and a CPC has two states based on input signal INI value if the CPC has INI input:

Initial data loading state: When INI is asserted, node W is deasserted, leaving right shift registers 450 in an idle state. There will be no output data latched into the output registers FFo and output signal Valid_O will be deasserted. Initialization data will be latched into the input registers FFi through D_I on the next clock cycle if input signal WE_I is asserted on the current clock cycle.

Working state: When INI is deasserted, working data will be latched into the input registers FFi through D_I on the next clock cycle if input signal WE_I is asserted on the current clock cycle; right shift registers 450 and its controller 460 are active, output signals WE_O, D_O and Valid_O work as designed.

In both situations input data will be acceptable on every clock cycle. Clock signal is not drawn in the present invention for clarity and simplicity.

FIG. 4A is the schematics of the right shift register controller 460 of a WPC series_module (SM). Or-gate OR1 has (X+2) input signals, where X is the number of series clock cycles, and under slow mode X=1.

Each of input signals Q0-Qx is driven by Q output of one bit register of the right shift registers, respectively, and the series CPC has valid data if one of Q0-Qx is asserted or invalid data otherwise.

Input signal W is working input data ready signal. If input signal INI of a SM is asserted, W is deasserted; when input signal INI is deasserted, input signal W is equal to input signal WE_I of the SM.

Or-gate OR1 output signal E drives enable signal E to each bit register of the right shift registers 450. The right shift registers 450 will right shift one bit on next clock cycle if E is asserted on the current clock cycle or will not otherwise. Right shift registers 450 will right shift one bit on next clock cycle in either of two situations:

There are valid data in the linked CPC.

There is a working input data to enter the linked CPC.

Care must be taken before input signal INI is asserted if its CPC still contains valid data in it. In the situation the linked SM will continue to work to output internal valid data until it is empty, but the CPC may change its internal data flow if input signal INI to the CPC is asserted, contaminating the outgoing data. Of course, to people in the art the embodiment of right shift registers can be replaced by embodiment of left shift registers.

Based on connections of FIG. 3 and FIG. 3A a WPC series_module has nothing to do with input data at D_I and output data at D_O of its linked CPC, so series_module can handle any types of input data and output data of a series CPC and doesn't have any overloading type.

Wave-Pipelining Component Input Delay Module (IDM) in HDL

There may be more than one feedback paths for a feedback critical path each of which signals take different times to propagate through. Apparently if signals propagating through the longest feedback path are stabilized when arriving at their input registers signals propagating through all other shorter feedback paths are also stabilized, so only the feedback of a feedback critical path is needed to pay attention to.

FIG. 5 is the interface of a WPC embodiment input_delay module (IDM) linked with a series or feedback CPC in FIG. 5A. There are two types of CPCs a WPC input_delay_module may be linked with:

If the linked CPC is a feedback CPC, input data is acceptable on every feedback or more clock cycles in order for feedback input data to be stable and to meet the wave-pipelining requirements.

If the linked CPC is a series CPC, its link with a WPC input_delay_module is to guarantee that its wave-pipelining requirements are always met with input data acceptable on every one or more clock cycle.

A feedback CPC has feedback coming from the middle of its combinational logic, so its series critical path always exists and its number of series clock cycles is always equal to or greater than its number of feedback clock cycles.

In addition to input signals CLK, RESET and SINI, a WPC input_delay_module in FIG. 5 has two input signals and five output signals:

Input signal INI is designed to load initialization data into the linked CPC. Input data at D_I for the linked CPC is initialization data if INI is asserted, or working input data otherwise. The assertion of input signal INI may last as long as needed. Input INI must be connected to '0' or left opened with default value being '0' if the linked CPC doesn't need initialization data. Input signal INI must be asserted after one of RESET/SINI is asserted to make sure that IDM is at the initial state, or wait for the series clock number of clock cycles to let the CPC empty.

Input signal Ready_I is used to indicate that input data at D_I of its linked CPC is ready if it is asserted or not otherwise.

Output signal WE_I_O is used as write enable signal to the input registers of the linked CPC. After WE_I_O output signal is asserted, input signals Ready_I and D_I should be properly updated on next clock cycle.

Two other output signals WE_O and Valid_O in FIG. 5 have the same roles as those in FIG. 3, respectively.

Output signal S_O is the output S_O of its attached SM, optional and used for debugging or implementing purpose.

Output signal R_O is optional, Q outputs of all bit registers of a left rotator and used for debugging or implementing purpose if internal wave constant one hot is '1' and there is the left rotator, or connected to ground if one hot is '0' and there is a counter, not a left rotator.

The assertion of each of WE_I_O, WE_O and Valid_O lasts one clock cycle for each valid data, respectively.

FIG. 5A is the interface of a series or feedback CPC linked with a WPC input_delay_module in FIG. 5. The interfaces of FIG. 3A and FIG. 5A are the same. Part of input registers in FIG. 5A is connected to the feedback if a feedback CPC is linked with. The dashed lines between FIG. 5 and FIG. 5A show how input and output signals of two components, a WPC IDM and a CPC, are connected. In addition to the connection of global clock signal CLK there are three connections between the two connected components:

Input signals INI of both WPC and CPC are connected together if the linked CPC needs to load initialization data into it before working normally.

Output signal WE_I_O of input delay module in FIG. 5 drives input signal WE_I of the linked CPC in FIG. 5A.

Output signal WE_O of input delay module in FIG. 5 drives write enable input signal WE_O_I of the linked CPC in FIG. 5A.

FIG. 6 is the schematics of a WPC embodiment input_delay_module using a counter and linked with a series or feedback CPC and with input data acceptable on every one or more clock cycle. 600 is the linked CPC; 610 is the input registers of input data bus width; 620 is the combinational logic; 630 is the output registers of output data width; 640 is the possible feedback of feedback path width if the linked CPC is a feedback CPC, or there is no feedback 640 if it is a series CPC. Input data bus width may be different from output data width. 650 is the schematics of a WPC input_delay_module; 660 SM is a series module used to handle the series critical path, generating write enable signal WE_O_I to the output registers, data valid signal Valid$_o$O for the linked CPC and assistant output signal S_O. Output data at D_O is valid if Valid_O is asserted or invalid otherwise. Counter box 680 contains a counter 690, five input signals CLK, RESET, SINI, INI and Ready_I, two output signals WE_I_O and R_O as described in FIG. 5, and a 2-input multiplexor M0. 2-input multiplexor M0 has its '0' input coupled to W output of counter 690, its '1' input coupled to input signal Ready_I, its select input coupled to input signal INI and its output driving input signal WE_I of SM 660 and output signal WE_I_O. In FIG. 6 internal wave constant one_hot is equal to '0', no left rotator is generated and assistant output signal R_O is connected to ground. Dashed line 670 and counter box 680 in FIG. 6 are mutually exclusive:

Under slow mode or under target mode with the number of input data clock cycles being 1, dashed line 670 exists and counter box 680 doesn't; input signal Ready_I directly drives output signal WE_I_O and input signal WE_I of SM 660, then an IDM 650 degenerates to a SM 660.

Under target mode with the number of input data clock cycles being greater than 1, counter box 680 exists and dashed line 670 doesn't.

A linked pair of an IDM and a CPC has two states based on input signal INI value if the CPC has the INI input:

Initial data loading state: When INI is asserted, Ready_I directly drives input signal WE_I of the linked CPC, making initialization input data acceptable on every clock cycle and leaving SM 660 in disable state and counter 690 in idle value zero state. Output signals WE_O and Valid_O will be deasserted, and there will be no output data latched into the output registers FFo.

Working state: When INI is deasserted, SM 660 and counter 690 are in normal working state and input data to the linked CPC is acceptable on every input data clock cycles.

FIG. 6A is the schematics of the controller of counter 690 in FIG. 6. After the assertion of either RESET or SINI, the counter 690 will be cleared to zero immediately for RESET or on the next clock cycle for SINI. The data range of the counter 690 is between 0 and input_clock number−1. When counter 690 reaches its top value input_clock_number−1, it will go around to zero value on the next increase. The logic of a counter is well known and not drawn. The controller in FIG. 6A has three input signals:

Input signal INI: initialization data will be loaded into the linked CPC if INI is asserted or working data otherwise.

Input signal Counter_0: counter 690 has zero value if it is asserted, or not otherwise; and it plays two roles:

If INI is asserted, counter 690 will return to zero value state and stays there.

If INI is deasserted, working input data is acceptable if Counter_0 is asserted or not otherwise.

Input signal Ready_I: input data at D_I is ready if it is asserted or not otherwise.

A 2-input and-gate A0 has one input inversely coupled to INI, another coupled to Ready_I, and its output driving node R.

The controller in FIG. 6A has two output signals:

Output signal E: the counter 690 will be increased by 1 on the next clock cycle if E is asserted on the current clock cycle, or will not otherwise. 2-input or-gate OR1 has one input inversely coupled to Counter_0 input, another to node R and its output driving output signal E. The counter 690 will be increased by 1 on the next clock cycle if either the counter 690 has non-zero value on the current clock cycle or working input data at D_I is ready, or will not otherwise.

Output signal W: W plays a role only when INI is deasserted and working input data will enter the linked CPC. 2-input and-gate A1 has one input coupled to input Counter_0, another to node R and its output driving output signal W. Input registers 610 will clock in next working input data if output signal W is asserted, indicating that it is the turn for the linked CPC to accept new working input data and new working input data is ready, or will not otherwise.

FIG. 6B is the schematics of a WPC embodiment input_delay_module (IDM) using a rotator and linked with a series or feedback CPC and with input data acceptable on every one or more clock cycle. FIG. 6B is the same as FIG. 6 except that right rotator box 681 in FIG. 6B replaces counter box 680 in FIG. 6. Dashed line 670 and right rotator box 681 are mutually exclusive as in FIG. 6.

Under slow mode or under target mode with the number of input data clock cycles being 1, dashed line 670 exists and right rotator box 681 doesn't; input signal Ready_I directly drives output signal WE_I_O and input signal WE_I of SM 660, then an IDM 650 degenerates to a SM 660.

Under target mode with the number of input data clock cycles being greater than 1, right rotator box 681 exists and dashed line 670 doesn't.

The right rotator box 681 comprises two parts: right rotator 691 and its controller 695. In addition to input signals CLK, RESET and SINI, right rotator box 681 has two input signals INI and Ready I as described in FIG. 5, and two output signals WE_I_O and R_O. R_O is Q outputs of all bit registers of the right rotator 691 and used for debugging or implementing purpose. Right rotator 691 has Y-bits, Y is the number of input data clock cycles and Y>1. After either RESET input signal or SINI input signal is asserted, the right rotator 691 are set up with the most left bit being asserted and other bits being deasserted. Each bit register of the right rotator 691 is linked one after another with its Q output connected to D input of next bit register with exceptions: Q output of the most right bit register FFy is coupled to D input of the most left bit register FF1 to constitute right rotator 691.

Of course, to people in the art the embodiment of right rotator can be replaced by embodiment of left rotator.

FIG. 6C is the schematics of the controller 695 of right rotator 691 in FIG. 6B under target mode with the number of input data clock cycles being greater than 1. The controller in FIG. 6C has the same function and structure as the controller in FIG. 6A with one difference: in FIG. 6A Counter_0 of counter 691 is used to indicate when next input data is acceptable while in FIG. 6C signal Q1 plays the same role.

A linked pair of an IDM and a CPC with a rotator in FIG. 6B has same two states based on INI value as FIG. 6 does. Actually code of input delay module uses a left rotator to be consistent with the drawing in FIG. 6B, because bit FF1 is located on the most right side and bit FFy on the most left side in real world.

Wave-Pipelining Component Multiple_Copy_Module (MCM) in HDL

There are two situations where multiple copied CPCs are needed:
- When a series CPC has no feasible means to meet wave-pipelining requirements (9) or (10) and it is acceptable and worth using multiple copied critical paths to resolve the critical path problem with input data acceptable on every clock cycle.
- When there is a feedback CPC and input data propagating through the CPC is wanted to be acceptable on every clock cycle.

In the first case multiple copying a series CPC reduces the wave-pipelining requirement as specified in inequalities (11) and (12). In the second case multiple copying a feedback CPC means both eliminating data blockage caused by the condition that a feedback CPC can only accept input data on every feedback or more clock cycles, and relaxing the wave-pipelining requirements in the same time.

Sometimes either situation may lead to a scenario that at most one wave of input data is travelling through a critical path on any clock cycle, and the critical path problem is resolved. For example, signals need 1.3 clock cycles to propagate through a series CPC. When the CPC is double copied, input data enters into one of two CPCs alternately and data is latched into the output registers on the second clock cycle triggering edge after it enters a CPC, then it is not a real wave-pipelining, because there is at most one wave of input data propagating through a CPC on any clock cycle.

Suffix "_m" of a signal in FIG. 7, FIG. 7A, FIG. 8, FIG. 9, FIG. 9A, FIG. 10 indicates that it is a signal which has multiple sets of input or output signals each of which either comes from or goes to one of multiple copied CPCs.

Figures 7, 7A:
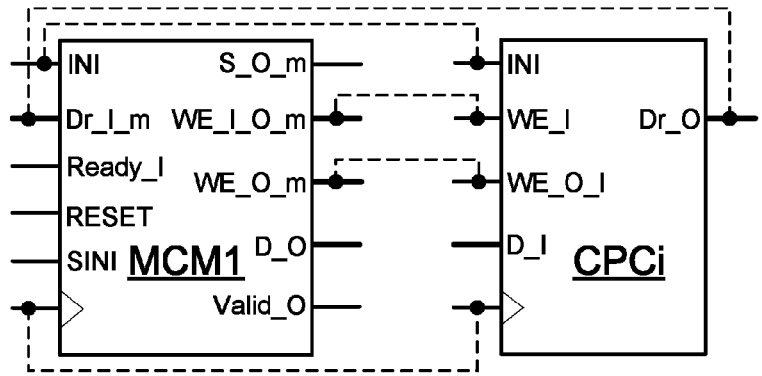
FIG. 7 is the interface of a WPC embodiment multiple_copy_module1 (MCM1) linked with one of multiple copied series or feedback CPCs in FIG. 7A.
FIG. 7A is the interface of one of multiple copied series or feedback CPCs linked with a WPC multiple_copy_module1 in FIG. 7.

FIG. 7 is the interface of a WPC embodiment multiple_copy_module1 (MCM1) linked with one of multiple copied series or feedback CPCs in FIG. 7A. In addition to the three global input signals RESET, SINI and CLK, the component has three additional input signals:

INI is designed to load initialization data into the linked CPC. Input data at D_I for the linked CPC is initialization data if INI is asserted, or working input data otherwise. The assertion of input signal INI may last as long as needed. Input INI must be connected to '0' or left opened with default value being '0' if the linked CPC doesn't need initialization data. Input INI must be asserted after either of RESET/SINI is asserted to make sure that MCM1 is at the initial state, or wait for the series clock number of clock cycles to let the CPC go empty.

Ready_I is asserted if input data at D_I is ready or not otherwise.

Dr_I_m is a multiple-set input data bus each set of which comes from the output registers of one of multiple copied CPCs and they are used to generate a unified output data bus D_O.

A multiple_copy_module1 has 5 output signals:

WE_I_O_m is a multiple-wire output signal each wire of which drives write enable signal to the input registers of one of multiple copied CPCs. When any wire of it is asserted, input signals Ready_I and D_I should be updated properly on the next clock cycle.

WE_O_m is a multiple-wire output signal each wire of which drives write enable signal to the output registers of one of multiple copied CPCs.

D_O is output data bus for the entire multiple copied CPCs.

Valid_O has the same meaning as before: data at output bus D_O is valid if Valid_O is asserted or invalid otherwise.

S_O_m is a multiple-set assistant output signal each set of which comes from output S_O of one of multiple copied SMs.

Each wire assertion of input and output signals Dr_I_m, Ready_I, WE_I_O_m, WE_O_m and Valid_O of a multiple_copy_module1 lasts one clock cycle for each valid data.

FIG. 7A is the interface of one of multiple copied series or feedback CPCs linked with a WPC multiple_copy_module1 in FIG. 7. The interface of FIG. 7A is the same as those of FIG. 3A and FIG. 5A with output signal Dr_O name in FIG. 7A replacing D_O name in FIG. 3A and FIG. 5A. 'r' stands for output data from output registers. The dashed lines between FIG. 7 and FIG. 7A show how input and output signals of two components, a WPC MCM1 and one of multiple copied CPCs, are connected. In addition to the global clock input signal CLK there are four connections between the two connected components:

Input signal INI of the CPC is optional. If it exists, the INI of the linked WPC multiple_copy_module1 is connected with all input signals INI of multiple copied CPCs.

Each wire of multiple-wire output signal WE_I_O_m of MCM1 in FIG. 7 drives write enable input signal WE_I of a CPC in FIG. 7A.

Each wire of multiple-wire output signal WE_O_m of MCM1 in FIG. 7 drives write enable input signal WE_O_I of a CPC in FIG. 7A.

Data bus output signal Dr_O from the output registers of a CPC in FIG. 7A drives one set of multiple-set data bus input signal Dr_I_m of MCM1 in FIG. 7.

A CPC in FIG. 7A may have any number of additional input and output signals to assist the component and those signals are not drawn here.

Figure 8:
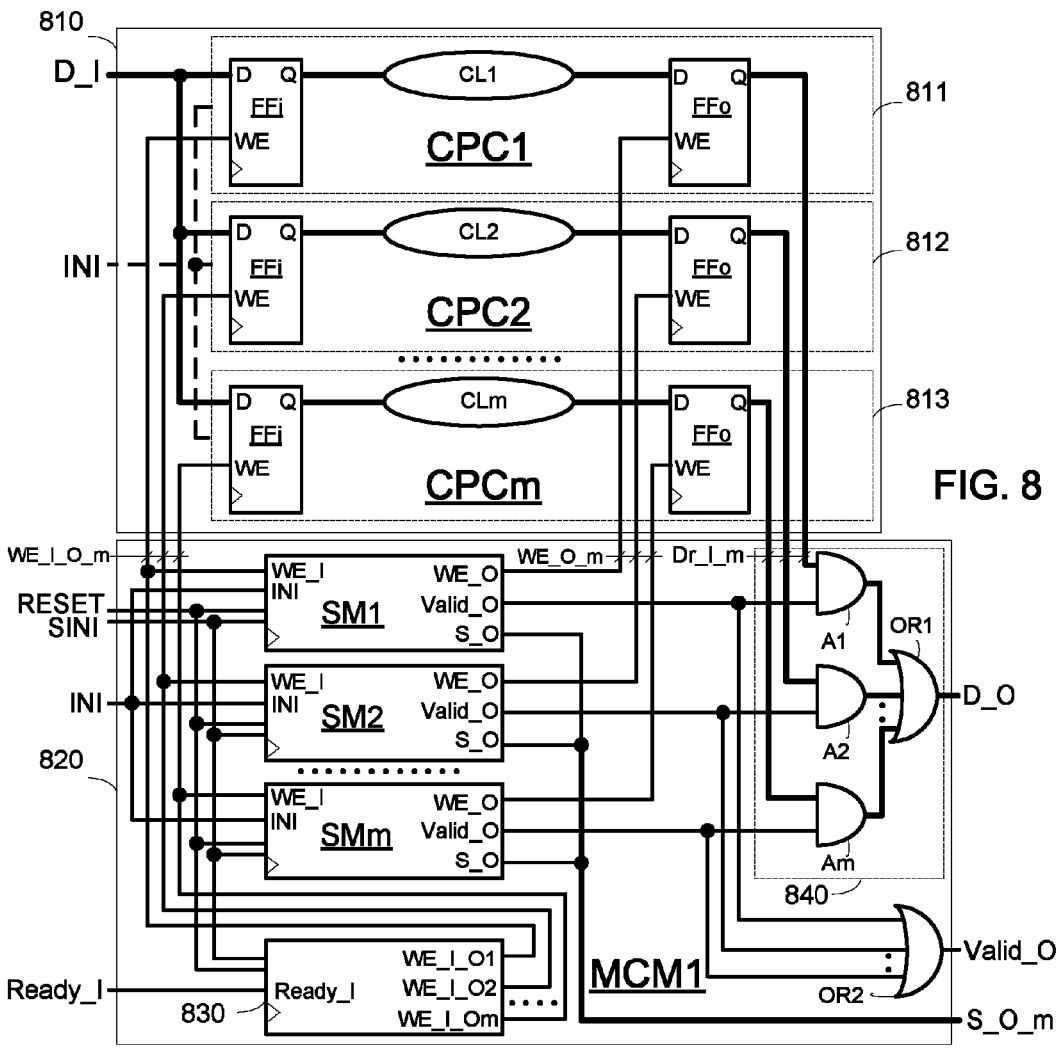
FIG. 8 is the schematics of a WPC embodiment multiple_copy_module1 linked with multiple copied series or feedback CPCs and with input data acceptable on every clock cycle.

FIG. 8 is the schematics of a WPC embodiment multiple_copy_module1 linked with multiple copied series or feedback CPCs and with input data acceptable on every clock cycle. Copying a CPC many times means that its attached series module is copied same times. 810 is data flow graph of multiple copied CPCs; 811, 812 and 813 are the first, second and m-th CPC, respectively; 820 is the data flow graph of a MCM1. SM1, SM2 and SMm are the first, second and m-th attached series_module, respectively; 830 is the controller of a MCM1 that will be described in FIG. 11-FIG. 11B. Each wire of multiple-wire output signal WE_O_m is generated through its attached series module and used as write enable signal to output registers of its corresponding CPC; each wire of multiple-wire output signal WE_I_O_m is generated through controller 830 and drives write enable signal WE to the input registers of its related CPC and WE_I input of its attached series_module; each set of multiple-set data input signal Dr_I_m comes from the output registers of one of multiple copied CPCs and is used to generate unified data output bus D_O. Black wider lines in FIG. 8 are data buses. 2-input and-gates A1, A2 and Am are of output data width deep and used to select one set of output registers of multiple copied CPCs as a unified output data.

Select box 840, 2-input and-gate A1-Am and or-gate OR1 in FIG. 8 are as deep as the width of output data bus D_O and represents the schematics of how one wire of output data bus D_O is generated. Each of 2-input and-gates A1, A2 and Am has one input coupled to the x-th indexed wire of one input data bus Dr_I_m(j), 1<=j<=m, respectively, another input to output signal Valid_O of its related series_module SMj, respectively. M-input or-gate OR1 has each of its input signals coupled to the output of a 2-input and-gate Aj, and its output D_O is the x-th indexed wire of the unified data output. The width of output data bus D_O is X's range. M-input or-gate OR2 has each of its inputs coupled to Valid_O output signal of one of attached series_module SM and its output drives Valid_O output signal. Output data at D_O of or-gate OR1 is valid if output signal Valid_O of or-gate OR2 is asserted or invalid otherwise.

FIG. 8 can be optimized if one set of output registers replaces multiple sets of output registers without effects on implementing wave-pipelining, so there are two versions of the implementation: multiple_copy_module1 and multiple_copy_module2 in HDL.

FIG. 9 is the interface of a WPC embodiment multiple_copy_module2 (MCM 2) linked with one of multiple copied series or feedback CPCs in FIG. 9A. In addition to the three global input signals RESET, SINI and CLK, the component has three additional input signals, and input signals INI and Ready_I are the same as those in FIG. 7:

INI is asserted if input data at D_I is for initialization of the CPCs, or working data otherwise.

Ready_I is asserted if input data at D_I is ready or not otherwise.

Dc_I_m is a multiple-set input data bus each set of which comes from the combinational logic output of one of multiple copied CPCs and they are used to generate a unified output data bus D_O.

A MCM2 has 4 output signals:

WE_I_O_m is a multiple-wire output signal each wire of which drives write enable signal WE_I to the input registers of one of multiple copied CPCs.

D_O is output data bus for the entire multiple copied CPCs.

Valid_O has the same meaning as before: data at output bus D_O is valid if Valid_O is asserted or invalid otherwise.

S_O_m is a multiple-bus output signal, each of which comes from the shift registers output of the related SM for debugging or assistant purpose and optional.

Each wire assertion of input and output signals Dc_I_m, Ready_I, WE_I_O_m, WE_O_m and Valid_O lasts one clock cycle for each valid data.

FIG. 9A is the interface of one of multiple copied series or feedback CPCs linked with a WPC MCM2 in FIG. 9. The interfaces of FIG. 9A is the same as one of FIG. 7A except that there are two big differences:

A CPC in FIG. 9A outputs its combinational logic data through output signal Dc_O while a CPC in FIG. 7A outputs data from the output registers through output signal Dr_O and two purposely different output signal names Dc_O and Dr_O are used to distinguish them and 'c' stands for combinational logic output.

A CPC in FIG. 9A has its input signal WE_O_I connected to '0' while a CPC in FIG. 7A has its input signal WE_O₁_I connected to one wire of multiple-wire output signal WE_O_m of MCM1 in FIG. 7. The output registers in CPC of FIG. 9A will be optimized out if it exists and replaced by one set of output registers defined in MCM2 of FIG. 9.

The dashed lines between FIG. 9 and FIG. 9A show how input and output signals of two components, a WPC MCM2 and one of multiple copied CPCs, are connected. In addition to the global clock input signal CLK there are three connections between the two connected components:

Input signals INI in FIG. 9 and FIG. 9A are connected together if the CPCs need initialization data before they start working, or the input signal INI in FIG. 9 is connected to '0' otherwise.

Each wire of multiple-wire output signal WE_I_O_m of MCM2 in FIG. 9 drives write enable signal WE_I of a CPC in FIG. 9A.

Data bus output signal Dc_O from combinational logic data of a CPC in FIG. 9A drives one set of multiple-set data bus input signal Dc_I_m of MCM2 in FIG. 9.

A CPC in FIG. 9A may have any number of additional input and output signals to assist the component and those signals are not drawn here.

FIG. 10 is the schematics of a WPC embodiment multiple_copy_module2 (MCM 2) linked with four copies of a series or feedback CPC under target mode and with input data acceptable on every clock cycle. The schematics in FIG. 10 are basically the same as one in FIG. 8 with three different points:

820 MCM1 in FIG. 8 receives output data from the output registers of each of CPCs while 1020 MCM2 in FIG. 10 receives output data from combinational logic output of each of CPCs.

820 MCM1 in FIG. 8 has a unified way to generate a valid output data for any number of multiple copied CPCs as shown in 840 in FIG. 8 while 1020 MCM2 in FIG. 10 has five different ways to generate a valid output data in order to have as few effects as possible on the wave-pipelining requirements, based on the number of copied CPCs: one copy, two copies, three copies, four copies and more copies of a CPC with four copies of CPCs drawn in FIG. 10.

FIG. 8 uses multiple sets of output registers contained in CPCs while FIG. 10 uses one set of output registers contained in MCM2.

1010 is data flow graph of four copied CPCs; CPC1, CPC2, CPC3 and CPC4 are the first, second, third and fourth CPC, respectively; 1020 is the schematics of a MCM2. SM1, SM2, SM3 and SM4 are the first, second, third and fourth attached series module, respectively; 1030 is the controller of the MCM2 that will be described in FIG. 11-FIG. 11B. WE_O generated through an attached SM is used as both write enable signal to the final output registers FF1 and select signal to select input data to the output registers FF1. Each wire of multiple-wire output signal WE_I_O_m is generated through controller 1030 and drives input signal WE to the input registers of its related CPC and WE_I input of its series_module; each set of multiple-set bus data input signal Dc_I_m comes from combinational logic output of its related CPC and is used as input data to output registers FF1 through a select box 1040. Black wider lines in FIG. 10 are data buses. 2-input Or-gate ORw12 has its one input coupled to signal WE_O from SM1, another input to signal WE_O from SM2 and its output driving select input to 2-input multiplexer M2 and one input to 3-input or-gate ORw. 3-input or-gate ORw has its second input coupled to signal WE_O from SM3 and third input to signal WE_O from SM4, and its output driving write enable signal WE to output registers FF1.

Select box 1040, 2-input multiplexers M0, M1, M2 and output registers FF1 in FIG. 10 are as deep as the width of output data bus D_O and represent the schematics of how one wire of output data bus D_O is generated. 2-input multiplexer M0 has its '0' input coupled to the x-th indexed wire of combinational logic input bus Dc_O1, its '1' input coupled to the x-th indexed wire of combinational logic input bus Dc_O2, its select input coupled to signal WE_O from SM2 and its output drives '1' input to 2-input multiplexer M2. 2-input multiplexer M1 has its '0' input coupled to the x-th indexed wire of combinational logic input bus Dc_O3, its '1' input to the x-th indexed wire of combinational logic input bus Dc_O4, its select input coupled to signal WE_O from SM4 and its output drives '0' input to 2-input multiplexer M2. 2-input multiplexer M2 has its output coupled to D input to output registers FF1. Q data output of output registers FF1 drives the x-th indexed wire of output data bus D_O. The width of output data bus D_O is X's range. 4-input or-gate ORw has each of its inputs coupled to Valid_O output signal of one of four attached SMs and its output drives Valid_O output signal. Output data at D_O of output registers FF1 is valid if output signal Valid_O is asserted or invalid otherwise.

FIG. 10A-FIG. 10D are the variations of the select box 1040 in FIG. 10 for one copy, two copies, three copies and more than four copies of CPCs and 2-input multiplexers M0 and M1, 2-input and-gates A1-Am, 2-input or-gate OR1 and output registers FF1 in FIG. 10A-FIG. 10D are as deep as the width of output data bus D_O and represents the schematics of how one wire of output data bus D_O is generated.

FIG. 10A is the schematics of select box 1040 in FIG. 10 for a WPC MCM2 linked with one series or feedback CPC under either slow mode or target mode. Output registers FF1 has its D input coupled to the x-th indexed wire of the combinational logic input bus Dc_O1, its write enable signal coupled to WE_O signal from its linked SM1 and its Q output drives the x-th indexed wire of output data bus D_O.

FIG. 10B is the schematics of select box 1040 in FIG. 10 for a WPC MCM2 linked with two copied series or feedback CPCs under target mode. 2-input multiplexer M0 has its '0' input coupled to the x-th indexed wire of the combinational logic input bus Dc_O1, its '1' input coupled to the x-th indexed wire of the combinational logic input bus Dc_O2, its select input coupled to WE_O signal from series module SM2 and its output drives D input to output registers FF1. 2-input or-gate OR0 has its one input coupled to WE_O signal from series_module SM1 and another to WE_O signal from series_module SM2, its output driving write enable signal WE to output registers FF1. Output registers FF1 has its Q output driving the x-th indexed wire of output data bus D_O.

FIG. 10C is the schematics of select box 1040 in FIG. 10 for a WPC MCM2 linked with three copied series or feedback CPCs under target mode. It is the simplified version of select box 1040 in FIG. 10 for three copied CPCs under target mode.

FIG. 10D is the schematics of select box 1040 in FIG. 10 for a WPC MCM2 linked with any other number of copies of a series or feedback CPC under target mode. It is the same as box 840 in FIG. 8.

It is important to note that checking wave-pipelining requirement inequality (10) in FIG. 10 can skip for logic in select box 1040 in FIG. 10, FIG. 10A, FIG. 10B, FIG. 10C and FIG. 10D. There are two reasons:

Combinational logic data input signal Dc_I_m from different CPCs are never mixed due to logic generated on the last clock cycle by select box 1040 and FIG. 10A-FIG. 10 D.

Signals from combinational logic output bus of one CPC are never mixed due to logic generated on the last clock cycle by select box 1040 and FIG. 10A-FIG. 10D.

In most situations multiple_copy_module2 is preferred over multiple_copy_module1 and the reason is that multiple_copy_module2 uses one set o output registers while multiple_copy_module1 uses multiple sets of output registers without impact on their performance.

The three schematics in FIG. 11-FIG. 11B apply to both controller box 830 in FIG. 8 and controller box 1030 in FIG. 10.

FIG. 11 is the schematics of the controller of a WPC multiple_copy_module linked with one series or feedback CPC under either slow mode or target mode. Input signal Ready_I directly drives output signal WE_I_O1. In the situation a multiple_copy_module degenerates to a series module.

FIG. 11A is the schematics of the controller of a WPC multiple copy module using a counter under target mode with wave constant multiple_copy_number=m, m>1. Box 1100 is a counter with range from 0 to m−1. After either of global input signals RESET and SINI is asserted, the counter 1100 is cleared to zero immediately for asserted RESET or after next clock triggering edge for asserted SINI. Counter 1100 will be increased by 1 on the next clock cycle or goes around from m−1 to zero if Ready_I is asserted on the current clock cycle or will not otherwise. Q0, Q1, . . . , Qm−1 are output ports each of which is asserted if the counter value equals to its output port series number or not otherwise. The counter and its internal logic are not drawn because they are well-known prior art knowledge. Each of 2-input and-gate A1, A2, . . . , Am has one input coupled to input signal Ready_I, another to one of output ports of the counter, and its output driving one of output signals WE_I_O1 -WE_I_Om accordingly.

FIG. 11B is the schematics of the controller of a WPC multiple_copy_module using a right rotator under target mode with wave constant multiple_copy_number=m, m>1. Bit registers FF1, FF2, . . . , FFm constitute a right rotator 1110. Right rotator 1110 has m-bits, its each bit register has its Q output driving D input of next bit register and Q output of the most right bit register FFm drives D input of the most left bit register FF1. After either of global input signals RESET and SINI is asserted, the most left bit register FF1 is asserted and other bit registers are deasserted immediately for asserted RESET or after next clock triggering edge for asserted SINI. The right rotator 1110 will right rotate one position on next clock cycle if Ready_I is asserted on the current clock cycle. Each of 2-input and-gates A1, A2, . . . , Am has one input coupled to Ready_I input signal, respectively, another to Q output of one bit register and its output driving one of output signals WE_I_O1_WE_I_Om accordingly.

FIG. 11A using a counter 1100 is preferred over FIG. 11B using a right rotator 1110.

A linked pair of a MCM and multiple copied CPCs in FIG. 8 or FIG. 10 has two states based on input signal INI value if the CPCs have the INI input:

Initial data loading state: When INI is asserted, initialization data will be latched alternately into one of multiple sets of the input registers FFi on the next clock cycle if input Ready_I is asserted on the current clock cycle, or will not otherwise. Output signals WE_O_m and Valid_O will be deasserted.

Working state: When INI is deasserted, working data will be latched alternately into one of multiple sets of the input registers FFi on the next clock cycle if input Ready_I is asserted on the current clock cycle, or will not otherwise. Output signals WE_O_m, D_O and Valid_O will work normally as designed.

In both situations input data is acceptable on every clock cycle.

Here are the rules on how undrawn input and output signals of multiple copied CPCs are connected in FIG. 8 and FIG. 10.

All undrawn input signals of same name for multiple copied CPCs are connected together.

All undrawn output signals from multiple copied CPCs must have different names, or it is an error otherwise.

New Concurrent Link Statement in HDL

In order to let a synthesizer identify which code is a wave-pipelining ready code and help check the correctness of connections and paired type between a WPC instantiation and a CPC instantiation, three versions of new concurrent link statement are suggested to be introduced into HDL.

Here is the definition of new concurrent link statement in bold type based on VHDL-2002:

```
concurrent_statement ::=
  block_statement
  | link_statement
  | process_statement
  | concurrent_procedure_call_statement
  | concurrent_assertion_statement
  | concurrent_signal_assignment_statement
  | component_instantiation_statement
  | generate_statement
link_statement ::=
  [ link_label : ] link_name ( wave_pipelining_component_label ,
    critical_path_component_label [ , alias_wave_constant_list ] ) ;
link_label ::= label
link_name ::= link1 | link2 | link3
wave_pipelining_component_label ::= label
critical_path_component_label ::=
  series_component_label
  |input_delay_component_label
  |multiple_copy_component_label
series_component_label ::= label
input_delay_component_label ::= label
multiple_copy_component_label ::= generate_label , copy_component_label
copy_component_label ::= label
label ::= identifier
```

The set of following rules is called link statement mechanism:

Link1 statement links a WPC series_module instantiation with a series CPC instantiation and optional alias wave constants whose initial value is wave constant series_clock_number and which share the wave constant value of the linked WPC series_module.

Link2 statement links a WPC input_delay module instantiation with a series or a feedback CPC instantiation, and optional alias wave constants whose initial value is either wave constant series_clock_number or input_clock_number and which share the wave constant value of the linked WPC input_delay module.

Link3 statement links a WPC multiple_copy_module instantiation with a generate statement, a series or a feedback CPC instantiation, and optional alias wave constants whose initial value is either wave constant series_clock_number or multiple_copy_number and which share the wave constant value of the linked WPC multiple_copy_module.

Wave_pipelining_component label is the label marking the instantiation of a WPC series_module, input_delay module or multiple_copy_module.

Critical_path component_label is the label marking a CPC instantiation.

Series_component label is the label marking the instantiation of a series CPC linked by a link1 statement.

Input_delay_component label is the label marking the instantiation of a series or a feedback CPC linked by a link2 statement.

Multiple_copy_component label contains two labels, the first one is generate_label marking a generate statement which generates multiple copied CPCs, the second is copy_component_label marking the instantiation of one of multiple copied series or feedback CPCs and linked by a link3 statement.

Both wave_pipelining component_label and critical_path_component_label must be located within the concurrent statement area of same architecture based on VHDL-2002, and can be referenced before they are defined in a link statement which is located in the same concurrent statement area.

An alias wave constant must be visible to the link statement it involves.

When a WPC multiple_copy_module is instantiated and linked with a generate statement through a link3 statement, the wave constant multiple_copy_number in the multiple_copy_module receives its new initial value through wave constant mechanism under slow mode and target mode, respectively, and the linked generate statement uses the wave constant multiple_copy_number constant value to generate 1 or more CPC under slow mode and target mode, respectively. The range used in the generate statement is fixed and must be from 0 to multiple_copy_number−1 or multiple_copy_number−1 down to 0.

The Pairing Rules Between a WPC and a CPC

Here are the paring rules on how a WPC and a CPC are paired.

A series CPC can be linked with one of four WPC embodiments:

With a WPC series_module: Input data is acceptable on every clock cycle. If wave-pipelining requirements are not met, a designer has to either repeat the attempt with more CPC code modification, change code manually to make it linking with an input_delay_module or a multiple_copy_module, or quit the attempt otherwise.

With a WPC input_delay_module: Input data is acceptable on every one or more clock cycle and its successful rate is 100%. If the number of input data clock cycles is large enough, there is at most only one wave of input data propagating through the CPC on any clock cycle and there are no wave-pipelining requirements any more.

With a WPC multiple_copy_module: Input data is acceptable on every clock cycle and its successful rate is 100%. The cost may be the input registers and combinational logic copied multiple times if it is linked with a multiple_copy_module2, or the output registers may also be copied same times if it is linked with a multiple_copy_module1.

A feedback CPC can be linked with one of three WPC embodiments:

With a WPC input_delay_module: Input data is acceptable on every feedback or more clock cycles and its successful rate is 100%. If the number of input data clock cycles is large enough, there is at most only one wave of input data propagating through the CPC on any clock cycle, and there are no wave-pipelining requirements any more.

With a WPC multiple copy module: Input data is acceptable on every clock cycle and its successful rate is 100%. The cost may be the input registers and combinational logic copied the number of feedback clock cycles or more times if it is linked with a multiple_copy_module2, or the output registers may also be copied same times if it is linked with a multiple_copy_module1.

A linked WPC input_delay_module or multiple_copy_module will degenerate to a WPC series_module if a synthesizer later finds that wave-pipelining requirements are met with one copy of the linked CPC and input data acceptable on every clock cycle, and there will be neither code change nor extra logic generated.

How a Synthesizer Determines Wave Constant Values for a Linked Pair of a WPC and a CPC Under slow mode a synthesizer doesn't do any wave-pipelining analysis and assumes that each of wave constants series_clock_number, input_clock_number and multiple_copy_number has initial value 1, ignoring their default values.

Figure 12:
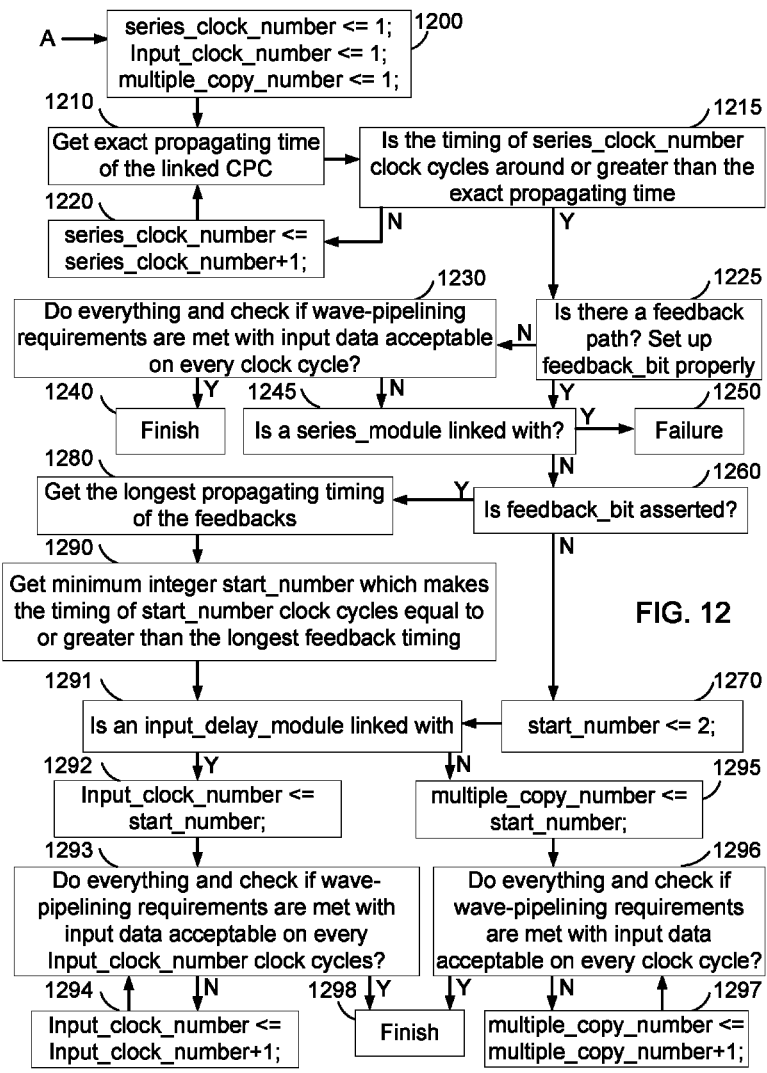
FIG. 12 is the flow graph showing how a synthesizer determines wave constant values for a linked pair of a WPC and a CPC under target mode.

FIG. 12 is the flow graph showing how a synthesizer determines wave constant values for a linked pair of a WPC and a CPC under target mode. The basic idea here is that a CPC contains the static logic part of a critical path while a WPC contains its dynamic logic part, and all three wave constants appeared in the linked WPC reflect the CPC's dynamic property, so they can be determined by a synthesizer after it has analyzed the CPC behavior, or in short, a WPC has its wave constant values based on its linked CPC behavior and their paired type.

Enter box 1200 through entry point A to make three wave constants series_clock_number, input_clock_number and multiple_copy_number equal to 1 and go to box 1210.

In box 1210 get the exact propagating timing of the linked CPC, and go to box 1215.

In box 1215 determine if the timing of series_clock_number clock cycles is around or greater than the exact propagating time of the linked CPC. Go to box 1225 if yes, or go to box 1220 otherwise.

Here is an example showing how a synthesizer determines if the timing of a number of clock cycles is around the exact time. If signals take 1.99 clock cycles to propagate through a CPC, a synthesizer may use some technical tricks to adjust controllable clock skew to make clock triggering edge for output registers happening just on 1.99 clock cycles. But the series clock number's nominal value is still 2. Adjusting clock triggering edges is not business of a digital designer, but of a synthesizer.

In box 1220, increase series_clock_number by 1 and go back to box 1210.

The loop among box 1210, 1215 and 1220 is necessary because a linked CPC may have any of its linked WPC's wave constants and output signals as its input signal, and different propagating times from different input signals.

In box 1225 determine if the CPC has a feedback; if so, assert feedback_bit and go to box 1245, or deassert feedback_bit and go to box 1230.

In box 1230 do everything in software and hardware capability to improve the CPC's chance to be succeeded with wave-pipelining and check if wave-pipelining requirements are met with input data acceptable on every clock cycle. If not, go to box 1245, or go to box 1240 otherwise.

In box 1240 all wave constants for the linked WPC have been determined and the process successfully ends.

In box 1245 test if a WPC series_module is linked with; if yes, go to box 1250, or go to box 1260 otherwise.

In box 1250, report that a wave-pipelining ready code fails, either because the wave-pipelining requirements are not met with input data acceptable on every clock cycle, or there are feedbacks and a WPC series_module is linked with that violates the pairing rules. The latter error can be easily resolved by changing the linked WPC series_module to a WPC input_delay_module or multiple_copy_module.

In box 1260 test if feedback bit is asserted and if yes, deassert it and go to box 1280, or go to box 1270 otherwise.

In box 1270 make start_number equal to 2 and go to box 1291.

In box 1280 get the longest propagating timing of the feedbacks, and go to box 1290.

In box 1290 get minimum integer start number which makes the timing of start_number clock cycles equal to or greater than the longest propagating timing of the feedbacks, and go to box 1291.

In box 1291, test if a WPC input delay module is linked with. If not, it shows that a WPC multiple_copy_module is linked with and go to box 1295, or go to 1292 otherwise.

In box 1292 make input_clock_number equal to start number, and go to box 1293.

In box 1293 do everything in software and hardware capability to improve the CPC's chance to be succeeded with wave-pipelining and check if wave-pipelining requirements are met with input data acceptable on every input_clock_number clock cycles. If not, go to box 1294, or go to box 1298 otherwise.

In box 1294, increase input_clock_number by 1, and go back to box 1293. If input_clock_number is equal to series_clock_number, there is at most one wave of input data propagating through the CPC on any clock cycle and there are no wave-pipelining requirements any more.

In box 1295 make multiple_copy_number equal to start_number, and go to box 1296.

In box 1296 do everything in software and hardware capability to improve the CPC's chance to be succeeded with wave-pipelining and check if the wave-pipelining requirements are met with input data acceptable on every clock cycle. If not, go to box 1297, or go to box 1298.

In box 1297, increase multiple_copy_number by 1, and go back to box 1296. If multiple_copy_number is equal to series_clock_number, there is at most one wave of input data propagating through each of multiple copied CPCs on any clock cycle and there are no wave-pipelining requirements any more.

In box 1298 all values of wave constants series_clock_number, input_clock_number and multiple_copy_number are determined and the process successfully ends.

If a linked CPC doesn't meet wave-pipelining requirements with input data acceptable on every clock cycle, there are three situations, depending on what type of WPC is linked with through a link statement:

If the linked WPC is a series_module a synthesizer declares it a failure and let designers select other choice for the circuit.

If the linked WPC is an input_delay_module a synthesizer can increase input_clock_number one by one starting from 2 for a series CPC or from feedback clock number for a feedback CPC to relax wave-pipelining requirements until input_clock_number=series_clock_number in which case there is at most one wave of input data propagating through the CPC on any clock cycle and there are no wave-pipelining requirements any more. The minimum integral number of clock cycles making wave-pipelining requirements and possible feedback clock number satisfied is the input_clock_number value.

If the linked WPC is a multiple_copy_module a synthesizer can increase wave constant multiple_copy_number one by one starting from 2 for a series CPC or from feedback clock number for a feedback CPC to relax wave-pipelining requirements until multiple_copy_number=series_clock_number in which case there is at most one wave of input data propagating through each of multiple copied CPCs on any clock cycle and there are no wave-pipelining requirements any more. The minimum integral number of clock cycles making wave-pipelining requirements and possible feedback clock number satisfied is the multiple_copy_number value.

How a Synthesizer Gets Wave Constant Values of a WPC Under Target Mode

If no errors are detected under target mode and following first 6 preparatory steps are finished, a synthesizer does one of steps 7)-9) to get wave constant values of a WPC embodiment.

1. Establish a wave constant signal table with one row for one link statement and following fields in one row:
   a. A file pointer pointing to the source file which contains the link statement.
   b. An integer to store the type of a WPC module: it has five values: 0-4. 0: The row is not used; 1-4: one value for one of four WPC embodiments: series_module, input_delay_module, multiple_copy_module1 and multiple_copy_module2.
   c. A string pointer pointing to a WPC instantiation label name string.
   d. A string pointer pointing to a CPC instantiation label name string.
   e. A string pointer pointing to a generate statement label name string.
   f. A character pointer pointing to the text position of the WPC instantiation label name string in the source file.
   g. A character pointer pointing to the text position of the CPC instantiation label name string in the source file.
   h. A character pointer pointing to the text position of the generate statement label name string in the source file.
   i. An integer to store wave constant series_clock_number value: the number of series clock cycles for the linked WPC instantiation; 1<=series_clock_number.
   j. An integer to store wave constant input_clock_number value: the number of input data clock cycles for the linked WPC instantiation; 1<=input_clock_number<=series_clock_number.
   k. An integer to store wave constant multiple_copy_number value: the number of multiple copied CPC instantiations; 1<=multiple_copy_number<=series_clock_number.
   l. One bit OK: '1' : wave-pipelining is a success; '0': failure.
2. Clear all rows in the table and make equal to 1 integer row_index which is used as row index to the table for a new link statement. Row zero in the wave constant signal table is reserved for alias wave constants each of which has no appearance within a link statement.
3. Fill fields a-e of a new row indexed by row_index for a new link statement, respectively, increase row_index by 1 after the filling for each link statement.
4. Fill one of fields f-h of a proper row in the table, respectively, when a WPC instantiation, a CPC instantiation or a generate statement is met. The proper row can be found by searching the table based on their label name strings, no matter whether a link statement is located before or after its related WPC or CPC instantiation is declared.
5. Fill wave constant fields i-k of each row in the table based on the method described in FIG. 12 and assert "OK" field if the implementation of the instantiation is a success or deassert it otherwise. Step 5) must start after all link statements are met and the wave constant signal table is fully established in the source file.
6. Generate all WPCs circuits only after all CPCs in a design have been implemented successfully and the table has been fully established.
7. Get wave constant values of an instantiation of a WPC input_delay_module or multiple_copy_module by directly searching the table based on the instantiation label name string.
8. Get wave constant series_clock_number value of a WPC series_module instantiation by using following method:
   All instantiations of the WPC series module are classified into two groups:
   Group 1 contains all instantiations of series module each of which has link1 statement linking it with an instantiation of a series CPC. Each of wave constant series_clock_number values can be found by searching the table based on the series_module instantiation label name string.
   Group 2 contains all instantiations of series module each of which is at second level within the architecture of a WPC input_delay_module or a multiple_copy_module, doesn't have a link statement to link it with a CPC instantiation, and its series_clock_number value is inherited from its parent input_delay_module or multiple_copy_module.

A synthesizer has one additional signal:
An integer parent_series_clock number: its initial value is zero and it stores series_clock_number value of the instantiation of a WPC input_delay_module or a multiple_copy_module that is being currently handled, and the parent_series_clock_number value is valid if it is a non-zero or invalid otherwise.

Do two steps to get wave constant series_clock_number value for a series_module instantiation:
Make parent_series_clock_number equal to the series_clock number of an instantiation of an input_delay_module or a multiple_copy_module if starting analyzing the instantiation, and make parent_series_clock_number equal to zero if finishing the analysis.
Return the value in parent_series_clock_number if it starts analyzing a series_module instantiation and the value is a non-zero, or get its value by searching the wave constant signal table based on the instantiation label name string.

9. Get wave constant multiple_copy_number value appeared in a generate statement by directly searching the table based on the generate statement label name string.

How a Synthesizer Gets an Alias Wave Constant Value Under Target Mode

If no errors are detected under target mode and the following first four preparatory steps are finished, a synthesizer does step 5) to get an alias wave constant value.

1. Add a new row type of alias wave constant in a full signal name table of a source file with following fields:
   a. An integer to store signal type: it identifies every type of signals, including an alias wave constant.
   b. An integer to store type of wave constants: it has 4 values: 0-3. 0: the row is not used; 1-3: one value for one of three wave constants series_clock_number, input_clock_number and multiple_copy_number.
   c. A string pointer pointing to an alias wave constant name string: a synthesizer can search for by it to find the alias wave constant row in the table.
   d. An integer to store row index of a link statement in the wave constant signal table. A synthesizer can use it to get the shared WPC wave constant value in the wave constant signal table. 0: there is no link between the alias wave constant and a link statement; non-zero value: valid row index.
   e. An integer to store the alias wave constant value. 0: its real value has not been searched for; others: valid value of the alias wave constant.
2. Establish an alias wave constant row within the table for each of alias wave constants declared in an alias wave constant declaration and set up fields a-c properly and clear fields d-e of the row.
3. Fill field d of a proper row in the table if a link statement is met during the scanning the source code and an alias wave constant appears in the link statement. The row in the signal name table can be found by using the alias wave constant name string.
4. Generate any logic related to an alias wave constant only after all CPCs have been implemented successfully and the wave constant signal table has been fully filled in the source file.
5. Find a row in the signal name table based on the alias wave constant name string, and return the alias wave constant value in field e of the row if the value is not zero, or get it by accessing the wave constant signal table based on field d of the row, fill field e of the row with the value and return it.

How a Designer Generates a Successful Wave-Pipelined Design in HDL

Figure 13:
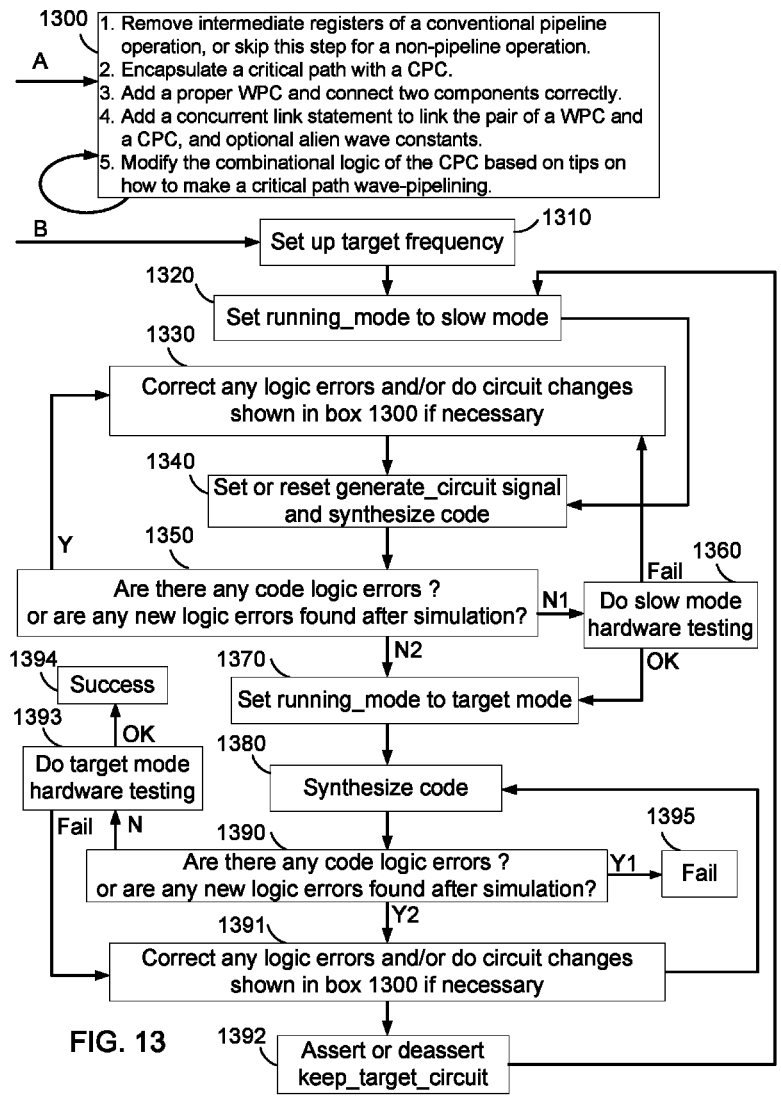
FIG. 13 is the flow graph showing how a digital designer generates a successful wave-pipelined design in HDL.

FIG. 13 is the flow graph showing how designers generate a successful wave-pipelined design in HDL. After code has been written without any involvement with wave-pipelining, designers enter box 1300 through entry point A.

In box 1300, do five things to change a critical path code to be a wave-pipelining ready code:
Remove intermediate registers of a conventional pipeline operation, or skip this step for a non-pipeline operation.
Encapsulate a critical path with a CPC.
Add a proper WPC and connect two components correctly.
Add a concurrent link statement to link both components.
Modify the combinational logic of a CPC based on tips on how to make a critical path wave-pipelining if necessary.

Repeat box 1300 for each of critical path code to be a wave-pipelining ready code. Then go to box 1310 through entry point B.

In box 1310 set up target running frequency under which the final design will run, and go to box 1320.

In box 1320 set synthesization switch running_mode to slow mode under which it is assumed that signals take one clock cycle to propagate through any of CPCs, and go to box 1340.

In box 1340 set or reset synchronization signal generate_circuit under which related circuit files will be generated to let designers to do slow mode hardware testing if it is asserted and there are no errors detected, or will not otherwise; then synthesize code and go to box 1350.

In box 1350 it is after code synthesization and it has three exits: if there are any code logic errors or new logic errors are found after simulation, go back to box 1330, or go to box 1360 if generate_circuit switch is asserted to do slow mode hardware testing, or go to box 1370 if there is no plan to do slow mode hardware testing.

In box 1330, correct logic errors, and/or do code changes shown in box 1300 if necessary, and go to 1340.

In box 1360, related circuit files are generated under slow mode and they can be used to do slow mode hardware testing. Under slow mode the slow running frequency is slow enough to make sure that signals take one clock cycle to propagate through any of CPCs with input data acceptable on every clock cycle and one copy of any of CPCs. After box 1360, designers may enter box 1370 to start target mode hardware testing if a slow mode hardware testing is a success in box 1360, or go to box 1330 to correct any errors otherwise.

In box 1370 set switch running_mode to target mode and go to box 1380.

In box 1380 synthesize code under target mode and go to box 1390.

In box 1390, it is after code synthesization and there are three exits in box 1390: if there are any logic errors or new logic errors are found after simulations, either go to box 1391 if more simulations are needed or go to 1395 if a piece of wave-pipelining ready code is doomed to fail, or go to box 1393 when no more errors occur.

In box 1391 correct logic errors, and/or change circuits shown in box 1300 if necessary, and go to box 1392 if more slow mode simulation is needed, or go to box 1380 to do more target mode simulations or hardware testing.

In box 1392, assert or deassert simulation signal keep_target_circuit and go to box 1320. When bit signal keep_target_circuit is asserted a synthesizer will keep all successfully modified CPC circuits under target mode unchanged under slow mode if related code doesn't change, or all modified part of CPC circuits under target mode will disappear under slow mode otherwise. By doing so some errors made by a synthesizer during circuit changing process under target mode may be detected, because those CPC circuit changes should never change logic and work under both target mode and slow mode, respectively.

In box 1393, all target mode simulations are successful and related circuits files are generated; designers can do target mode hardware testing to see if their design is a success; go to box 1391 to correct errors if new errors are found in hardware testing, or go to box 1394 otherwise.

In box 1394 it claims that the design target mode hardware testing is finished with a success and the full process ends successfully.

In box 1395 something big in simulations or hardware testing is wrong under target mode and a new strategy should be worked out.

Each time designers want to change target running frequency, enter box 1310 through entry point B.

There are two reasons to have two synthesization modes:
To save designers' time spent on simulations. Under slow mode all simulations and hardware testing are focused on resolving logic problems, non-wave-pipelining logic and wave-pipelining logic problems, both of which should work perfectly under slow running frequency while under target mode all simulations and hardware testing are focused on wave-pipelining ready circuits and total behaviors. Generating a wave-pipelined circuit by a synthesizer is a time-consuming process due to the inequality (10). The timing for a synthesizer to do synthesis is much shorter under slow mode than under target mode, because under slow mode a synthesizer doesn't need to do wave-pipelining analysis.

To provide designers a means to check if a synthesizer does a wrong thing during its circuit manipulating process. Under target mode a synthesizer does everything to make a wave-pipelining circuit working during synthesization. During the manipulating process, logic may be changed and there is a possibility it may introduce a logic error and signal keep_target_circuit in box 1392 in FIG. 13 can be used to keep circuit modified by a synthesizer unchanged when switching from target mode to slow mode that may expose the possible errors made by a synthesizer.

Here is an example showing how slow mode simulations are beneficial to a process in which a conventional pipelined 64-bit* 64-bit integer multiplier is transformed into a wave-pipelined circuit by removing all intermediate registers and adding additional logic to balance input delays at all gates. The process is certainly laborious and may introduce some logic errors. Before doing any target mode simulations, designers first do slow mode simulations to confirm that all changed logic works properly. It is easy for them to detect any logic errors under slow mode, because under slow mode signals take one clock cycle to propagate through any of critical paths with input data acceptable on every clock cycle. After slow mode simulations are correct designers can do target mode simulations and hardware testing without any code change and can more easily isolate any errors during target mode simulations by comparing two groups of testing data under slow mode and under target mode.

How Four WPC Embodiments are Simulated and Debugged

All four WPC embodiments can be simulated and debugged under current versions of a synthesizer in HDL even though wave constants, alias wave constants and link statements have no definitions in current versions of HDL.

The basic fact here is: all wave constants have initial value 1 under slow mode and different combinations of their initial values equal to or greater than 1 under target mode, and each alias wave constant shares its initial value of its linked WPC embodiment. Here the basic idea is: each of four WPC embodiments can be simulated using current versions of HDL by changing all wave constants to equivalent generic constants and all alias wave constants to normal constants, and assigning to each of wave constants and alias wave constants the same named global constant, series_clock_number, input_clock_number or multiple_copy_number, which can be all 1 for slow mode simulation or different combinations of any initial values for target mode simulations.

Here are the steps on how to simulate and debug all WPC embodiments:

1. Define global constants: series_clock_number, input_clock_number and multiple_copy_number, whose initial values are 1 for slow mode simulation and different combinations of their initial values equal to or greater than 1 for target mode simulations while keeping following two inequlities true:
   1<=input_clock_number<=series_clock_number;
   1<=multiple_copy_number<=series_clock_number.
2. Define global constants: one_hot, INI, data_in_width and data_out_width, and data_in_width=data_out_width.
3. Define global output data types: out_shift_array (VHDL-2002) and out_data_array(VHDL-2002 or VHDL-2008).
4. Change each of interface wave constant declarations to an interface constant declaration with one generic constant declared each for all WPC embodiments by following three steps:
   Make sure that each of interface wave constant declarations declares one wave constant. If not, repeat one interface wave constant declaration for one wave constant.
   Delete "wave" in an interface wave constant declaration.
   Assign each wave constant declared in an interface wave constant declaration the same named global constant signal through static_expression.
   So that each wave constant initial value can be provided by its same named global constant of series_clock_number, input_clock_number or multiple_copy_number.
5. Write a simplest CPC CPC1 which contains four key parts:
   Its interface meets the requirements of a CPC linking with a WPC series_module, input_delay_module or multiple_copy_module when input signal R_O_I='1', or the requirements of a CPC linking with a WPC multiple_copy_module2 otherwise.
   It has a generic constant series_clock_number which has global constant series_clock_number as its initial value.
   It has right shift registers R_I whose bit number=series_clock_number with R_I(series_clock_number−1 ), the most left bit registers, treated as CPC1 input registers and R_I(0), the most right bit registers, treated as the output of combinational logic output to simulate its variable combinational logic length.
   It has output registers R_O which is the output registers of CPC1 if input signal R_O_I='1', or R_O will be optimized out otherwise. R_I and R_O are of the same data width if R_O exists.

Here is how CPC1 works:
Here is how R_I works:
  When either of RESET or SINI is asserted, it is cleared properly.
  When INT='1': for initialization data loading simulation with input data acceptable on every one or more clock cycle.
    If WE_I='1', latch input data at D_I into the input registers of R_I and let other bit registers of R_I unchanged, simulating the situation that initialization data is latched into the input registers and no other activity of R_I occurs.
    If WE_I='0', there is no action of R_I.
  When INI='0': for working simulation with input data acceptable on every one or more clock cycle.
    If series_clock_number='1':
      If WE_I='1', latch input data at D_I into the input registers of R_I, simulating the situation where series_clock_number='1' for working clock cycle.
      If WE_I='0', no action of R_I occurs.
    If series_clock_number>'1':
      If WE_I='1', right shift R_I one bit with input data at D_I latched into the input registers of R_I, simulating the normal working situation.
      If WE_I='0', right shift R_I one bit per clock cycle with the input registers unchanged, simulating the situation where there is no input data entering.
Here is how R_O works:
  If input signal R O I='1': latch data at R I(0) into R O if input signal WE_O_I='1', or no action of R_O occurs otherwise,
  If input signal R_O_I='0': R_O will be optimized out.
CPC1 output signal D_O comes from output registers R_O if input signal R_O_I='1', or CPC1 output signal Dc_O comes from the combinational logic output R_I (0) otherwise.

6. Modify source code of both delay_input_module and multiple_copy_module by adding "SERIES_CLOCK_NUMBER=>SERIES_CLOCK_NUMBER," in generic map of their series_module instantiations so that each wave constant series_clock_number appeared in the instantiation of a WPC delay_input_module and multiple_copy_module will receive its initial value provided by global constant series_clock_number in the simulation.

7. Write code of four pairs of a WPC instantiation and a CPC1 instantiation according to the paring rules and connection rules:
  A pair of a WPC series_module instantiation and a CPC1 instantiation.
  A pair of a WPC input_delay_module instantiation and a CPC1 instantiation.
  A pair of a WPC multiple_copy_module1 instantiation and a CPC1 instantiation.
  A pair of a WPC multiple_copy_module2 instantiation and a CPC1 instantiation.

8. Change each of alias wave constant declarations as a normal constant declaration by deleting "wave" in an alias wave constant declaration if "wave constant" is used or replacing keyword "wave" with keyword "constant" if "wave" is used so that each alias wave constant initial value will be provided by one of global constants series_clock_number, input_clock_number and multiple_copy_number as it is originally defined.

9. Ignore all link statements. Each of link statements plays the role only for grammar check and easy analysis for a synthesizer and doesn't play any role in executing wave-pipelining technology if all wave constants and alias wave constants receive their initial values provided by global constants: series_clock_number, input_clock_number and multiple_copy_number in the simulation.

10. Run the code under different combinations of initial values of global constants series_clock_number, input_clock_number, multiple_copy_number, one_hot and INT with randomly generated input signal Ready_I and ordered input data streams: 1-9, 0-9, 0-9, . . . that will generate all situations for all four WPC embodiments under slow mode and target mode, respectively.

The source code of four WPC embodiments, the sample link statements, their simulations and debugging program is included in WPC-CPC.txt which is transmitted through USPTO EFL-WEB system as integral part of the patent application and incorporated here by reference. Change WPC-CPC.txt to WPC-CPC.vhd before simulating all four WPC embodiments.

By careful checking the source code it will show following features of a piece of standard wave-pipelining ready code:
  Adding a WPC has no impact on the performance of a CPC. It may complex the interface coding, but it never generates extra logic.
  During the tedious process of a CPC being adjusted to meet wave-pipelining requirements, the interfaces of the linked pair of a WPC and a CPC and their link statement don't change.
  A successfully implemented wave-pipelined circuit code doesn't change when switching from slow mode to target mode or vice versa.
  All CPCs can be adjusted and certified by a synthesizer one after another without mutual interference.

The present invention provides four WPC embodiments in VHDL. For people in the art multiple_copy_module1 and multiple_copy module2 can be overloaded with different output data types and each of WPC embodiments can be implemented in different HDL languages following the VHDL component examples, and all of them can be put into a new wave-pipelining system package in HDL to be used by all digital designers.

All these are intended to be encompassed by the following claims.

What is claimed is:

1. A method for use in coding a hardware source code in Hardware Description Language (HDL, hereafter) for an integrated circuit of wave-pipelining, the method comprising:
  coding a first code component in HDL, HDL being selected from a group comprising VHDL, Verilog and System Verilog, and the first code component being synthesized to generate a first logic block of the integrated circuit;
  coding a second code component in HDL, the second code component being interconnected with the first code component, and the second code component being synthesized to generate a second logic block of the integrated circuit; and
  coding one of a plurality of new concurrent link statements in HDL, the link statement identifying both the first code component and the second code component based on a dual code component property of the integrated circuit, the link statement in combination with the first code component and the second code component forming a standard wave-pipelining ready code, and the standard wave-pipelining ready code triggering a synthesis tool to generate a circuit as the integrated circuit of wave-pipelining instead of a normal pipeline circuit.

2. The method of claim 1 further comprising coding the first code component, the first code component comprising one or more critical path components, each of the one or more critical path components comprising a static logic part, the static logic part being unchanged if a number of series clock cycles through a critical path changes, the static logic part being unique for each of the integrated circuits, the critical path comprising an input register, an output register and a combinational logic, the combinational logic connecting the input register with the output register, the static logic part comprising the input register, either the static logic part or the second code component comprising the output register, the second code component comprising the output register only if there are more than one input register and the sole output register for the integrated circuit.

3. The method of claim 2 further comprising coding the link statement to further identify a concurrent generate statement, and the concurrent generate statement being used to generate the one or more critical path components.

4. The method of claim 2 further comprising coding the one or more critical path components under a coding rule (1), the coding rule (1) being that only one copy of the critical path component is generated.

5. The method of claim 2 further comprising coding a plurality of wave-pipelining components, each of the plurality of wave-pipelining components comprising a dynamic logic part of the one or more critical paths, the dynamic logic part being changed if the number of series clock cycles through the one or more critical paths changes, and the dynamic logic part being the same for a plurality of the integrated circuits.

6. The method of claim 5 further comprising coding a system library, the system library comprising the plurality of wave-pipelining components, and the wave-pipelining component being selected from the system library.

7. The method of claim 2 further comprising coding the one or more critical path components under a coding rule (2), the coding rule (2) being that a plurality of signals takes a one clock cycle to propagate through the one or more critical paths.

8. The method of claim 7 further comprising coding the one or more critical path components under a coding rule (3), the coding rule (3) being that the one clock cycle to propagate through the one or more critical paths is irrelevant to any of one or more target running frequencies.

9. The method of claim 5 further comprising coding the plurality of wave-pipelining components, each of the plurality of wave-pipelining components comprising one or more wave constants, an initial value of each of the one or more wave constants being unknown when the plurality of wave-pipelining components is being coded, and the initial value being determined after the synthesis tool has successfully analyzed the one or more critical paths.

10. The method of claim 9 further comprising coding each of the one or more wave constants in the plurality of wave-pipelining components like coding a generic constant in HDL.

11. The method of claim 9 further comprising coding the one or more critical path components, the one or more critical path components being classified into a first category and a second category, the first category of the critical path component being a series critical path component, and the second category of the critical path component being a feedback critical path component.

12. The method of claim 11 further comprising coding the plurality of wave-pipelining components with the one or more wave constants, the one or more wave constants comprising: (1) a first wave constant series_clock_number is defined to be equal to the number of series clock cycles for the one or more critical paths; (2) a second wave constant input_clock_number is defined to be equal to a number of input data clock cycles for the one or more critical paths; and (3) a third wave constant multiple_copy_number is defined to be equal to a constant number, the constant number being used to generate the one or more critical path components.

13. The method of claim 12 further comprising coding a first category of the plurality of wave-pipelining components, the first category comprising the first wave constant, the first category being pairing with the series critical path component, and the paired critical path component having an input data acceptable on every clock cycle.

14. The method of claim 13 further comprising coding a second category of the plurality of wave-pipelining components, the second category comprising both the first wave constant and the second wave constant, the second category being pairing with either the series critical path component or the feedback critical path component, and the paired critical path component having the input data acceptable on every one or more clock cycles.

15. The method of claim 14 further comprising coding the second category of the plurality of wave-pipelining components, and the second category being degenerated to the first category of the plurality of wave-pipelining components if the paired series critical path component has the input data acceptable on every clock cycle.

16. The method of claim 13 further comprising coding a third category of the plurality of wave-pipelining components, the third category comprising both the first wave constant and the third wave constant, the third category being pairing with one or more copies of either the series critical path component or the feedback critical path component, all of one or more copies of the paired critical path component together having the input data acceptable on every clock cycle, and each of one or more of the paired critical path components comprising one of the one or more output registers.

17. The method of claim 16 further comprising coding the third category of the plurality of wave-pipelining components, and the third category being degenerated to the first category of the plurality of wave-pipelining components if the third category is paired with one copy of the series critical path component.

18. The method of claim 13 further comprising coding a fourth category of the plurality of wave-pipelining components, the fourth category comprising both the first wave constant and the third wave constant, the fourth category being pairing with one or more copies of either the series critical path component or the feedback critical path component, all of one or more copies of the paired critical path component together having the input data acceptable on every clock cycle, and the fourth category comprising the sole output register for the integrated circuit.

19. The method of claim 18 further comprising coding the fourth category of the plurality of wave-pipelining components, and the fourth category being degenerated to the first category of the plurality of wave-pipelining components if the fourth category is paired with one copy of the series critical path component.

20. The method of claim 9 further comprising coding a third code component in HDL, the third code component being synthesized to generate a logic block outside of the integrated circuit, the third code component comprising one or more alias wave constants, and each of the one or more alias wave constants being defined to be equal to its parent wave constant.

21. The method of claim 20 further comprising coding each of the one or more alias wave constants in the third code component like coding a generic constant in HDL.

22. The method of claim 20 further comprising coding the link statement to further identify each of the one or more alias wave constants in the third code component, and the link statement establishing a connection for each pair of the daughter alias wave constant and the parent wave constant.

23. The method of claim 11 further comprising coding the link statement, a first type of the link statement linking the first category of the plurality of wave-pipelining components with the series critical path component, a second type of the link statement linking the second category of the plurality of wave-pipelining components with either the series critical path component or the feedback critical path component, and a third type of the link statement linking either the third category or the fourth category of the plurality of wave-pipelining components with one or more copies of either the series critical path component or the feedback critical path component.

24. The method of claim 2 further comprising coding the one or more critical path components under a coding rule (4), the coding rule (4) being that all of the one or more critical path components together have an input data acceptable on every clock cycle.

* * * * *